(12) United States Patent
Chou

(10) Patent No.: US 9,106,888 B2
(45) Date of Patent: Aug. 11, 2015

(54) REDUCING QUANTIZATION ARTIFACTS USING NEIGHBOR-BASED WEIGHTED DITHERING

(71) Applicant: Apple Inc., Cupertino, CA (US)

(72) Inventor: Jim C. Chou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 14/036,852

(22) Filed: Sep. 25, 2013

(65) Prior Publication Data

US 2015/0085921 A1    Mar. 26, 2015

(51) Int. Cl.
| | |
|---|---|
| G06K 9/36 | (2006.01) |
| G06K 9/46 | (2006.01) |
| G06K 9/00 | (2006.01) |
| H04N 19/126 | (2014.01) |
| H04N 19/176 | (2014.01) |
| H04N 19/119 | (2014.01) |
| H04N 19/117 | (2014.01) |
| H04N 19/86 | (2014.01) |

(52) U.S. Cl.
CPC ... *H04N 19/00096* (2013.01); *H04N 19/00066* (2013.01); *H04N 19/00072* (2013.01); *H04N 19/00278* (2013.01); *H04N 19/00909* (2013.01)

(58) Field of Classification Search
None
See application file for complete search history.

(56) References Cited

U.S. PATENT DOCUMENTS

| | | | |
|---|---|---|---|
| 7,787,541 B2 | 8/2010 | Osamoto et al. | |
| 8,139,883 B2 | 3/2012 | Zhang et al. | |
| 8,885,706 B2 * | 11/2014 | Bankoski et al. | ........ 375/240.03 |
| 2005/0276323 A1 * | 12/2005 | Martemyanov et al. | . 375/240.03 |
| 2006/0120450 A1 | 6/2006 | Han et al. | |
| 2007/0019729 A1 * | 1/2007 | Nakagomi et al. | ....... 375/240.13 |
| 2008/0260270 A1 * | 10/2008 | Lainema | ........................ 382/238 |
| 2011/0228843 A1 | 9/2011 | Narroschke et al. | |
| 2012/0307898 A1 * | 12/2012 | Chono et al. | ............. 375/240.13 |

OTHER PUBLICATIONS

ITU-T H2.64 "Series H: Audiovisual and Multimedia Systems Infrastructure of Audiovisual Services—Coding of Moving Video—Advanced video coding for generic audiovisual services" Apr. 2013 pp. 1-732.

* cited by examiner

*Primary Examiner* — Phuoc Tran
(74) *Attorney, Agent, or Firm* — Robert C. Kowert; Meyertons, Hood, Kivlin, Kowert & Goetzel, P.C.

(57) ABSTRACT

The forward transform and quantization components of the video encoders described herein may modify the quantization typically performed by video encoders to reduce quantization artifacts. For example, for a given pixel in an image macroblock, noise may be generated based on information about pixels in the neighborhood of the given pixel (e.g., DC transform coefficients or quantization errors of the neighbor pixels and corresponding programmable weighting coefficient values for the neighbor pixels) and this noise may be added to the DC transform coefficient for the given pixel prior to performing quantization. The weighting coefficient values may be chosen to shape the noise added to the DC transform coefficient values (e.g., to apply a filter operation). When applied to a chroma component of an image frame, this neighbor-data-based dithering approach may reduce color banding artifacts. When applied to the luma component, it may reduce blocking artifacts.

20 Claims, 18 Drawing Sheets

| $e_0$ | $e_1$ | $e_2$ |
|---|---|---|
| 1410 | 1420 | 1430 |
| $e_3$ | X | |
| 1440 | 1450 | |

FIG. 14

REDUCING QUANTIZATION ARTIFACTS USING NEIGHBOR-BASED WEIGHTED DITHERING

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 110 as shown in FIG. 1 represents an apparatus, or alternatively a software program, in which digital video input (input frames 120) is encoded or converted into another format (output frames 130), for example a compressed video format such as H.264/Advanced Video Coding (AVC) format (also referred to as MPEG 4 Part 10), according to a video encoding method. An apparatus or software program such as a video encoder 110 may include multiple functional components or units, as well as external interfaces to, for example, video input sources and external memory.

In some video processing methods, to perform the processing, each input video frame 120 is divided into rows and columns of blocks of pixels (e.g., 16×16 pixel blocks), for example as illustrated in FIG. 2 which shows an example 192×192 pixel frame 120 divided into 144 16×16 pixel blocks (illustrated in FIG. 2 as blocks 220). Each block of an input video frame 120 is processed separately, and when done the processed blocks are combined to form the output video frame 130. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 110 may include or implement a block processing pipeline 140. A block processing pipeline 140 may include two or more stages, with each stage implementing one or more of the steps or operations of the block processing method. FIG. 1 shows an example video encoder 110 that implements an example block processing pipeline 140 that includes at least stages 142A through 142C. A block is input to a stage 142A of the pipeline 140, processed according to the operation(s) implemented by the stage 142A, and results are output to the next stage 142B (or as final output by the last stage 142). The next stage 142B processes the block, while a next block is input to the previous stage 142A for processing. Thus, blocks move down the pipeline from stage to stage, with each stage processing one block at a time and multiple stages concurrently processing different blocks. Conventionally, the blocks are input to and processed by the block processing pipeline 140 in scan order as shown in FIG. 2. For example, in FIG. 1, the first block of the first row of the frame shown in FIG. 2 (block 0) is at stage 142C, the second block (block 1) is at stage 142B, and the third block (block 2) is at stage 142A. The next block to be input to the block processing pipeline 140 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

Video Encoding Artifacts

Lossy video encoders typically operate on prediction pixels for the luma and chroma components of image frames, applying a transform to those prediction pixels followed by a quantization process. However, for the luma and/or chroma components of the video image frames, the quantization can translate into "blocky" artifacts and/or "color banding" artifacts. For example, it is often the case that a spatial area that contains uniform chroma values will all be quantized to the same values thus resulting in noticeable areas of color banding. Within the H.264 standard, quantization can be performed more finely in an attempt to reduce such artifacts, but this would increase the bit rate.

SUMMARY OF EMBODIMENTS

Embodiments of block processing methods and apparatus are described in which a block processing pipeline includes multiple pipeline components, each of which performs one or more operations on a block of pixels from a video frame (or a representation thereof). As noted above, lossy video encoders may operate on prediction pixels for the luma and chroma components of image frames, applying a transform to those prediction pixels followed by a quantization process, and this process may induce different types of artifacts in the resulting luma and/or chroma components. Embodiments of the present disclosure may be used to modify the quantization typically performed by video encoders, which may reduce these artifacts. In some embodiments, for each given pixel, noise may be generated based (at least in part) on information about one or more pixels in the neighborhood of the given pixel and this noise may be added to the DC transform coefficient for the given pixel prior to performing quantization. When applied to the luma and/or chroma components, this approach may serve to significantly reduce color banding artifacts and/or blocking artifacts due to quantization. For example, in some embodiments, the techniques described herein may result in more than 10 dB of PSNR gain for the chroma component.

As described below, in some embodiments, the video encoders described herein may be configured to apply a transform to prediction data for a block partition of a macroblock of an image frame, generating source transform coefficients for each pixel of the macroblock. However, rather than passing these source transform coefficients to a quantization operation, the video encoder may first be configured to apply a neighbor-data-based dithering operation to each source transform coefficient to produce a modified transform coefficient. In some embodiments, the neighbor-data-based dithering operation may compute the noise to be added to each source transform coefficient based on the transform coefficients of one or more neighbor pixels, based on previously computed quantization errors for one or more neighbor pixels, and/or based on programmable weighting coefficient values for one or more neighbor pixels. For example, in at least some embodiments, the neighbor-data-based dithering operation may be dependent on data corresponding to a pixel to the left of the pixel currently being processed, a pixel to the top-left of the pixel currently being processed, a pixel above the pixel currently being processed, and a pixel to the top-right of the pixel currently being processed. In at least some embodiments, the noise added to each source transform coefficient may be dependent on the products of the previously computed quantization error values and corresponding weighting coefficients of these neighbors. After adding the computed noise to the source transform coefficients, the video encoders described herein may quantize the resulting modified transform coefficients.

In some embodiments, the weighting coefficients for each neighbor pixel may be programmable, and the weighting coefficients for at least two of the neighbors on which the neighbor-data-based dithering operation is dependent may be different. For example, in some embodiments, the weighting coefficients for each of the neighbor pixels may be chosen (e.g., programmed and/or otherwise configured) such that the application of the neighbor-data-based dithering operation implements a prediction filter (e.g., a low-pass filter or another type of filter).

The techniques described herein for performing quantization on transform coefficients that have been modified using a neighbor-data-based dithering operation may in some embodiments be applied to DC transform coefficients (as the source transformation coefficients), which may include chroma coefficients and/or luma coefficients. In some embodiments, the video encoders described herein may be configured to compute and save the resulting quantization errors for each pixel (e.g., as the difference between each of the source transform coefficients and the resulting quantized modified transform coefficient), and these quantization errors may be used as neighbor information in subsequent operations to transform and quantize the prediction data for other pixels in the macroblock.

BRIEF DESCRIPTION OF THE DRAWINGS

FIG. 14 illustrates the use of neighboring quantization errors in a dithering operation, according to at least some embodiments.

Figure 1:
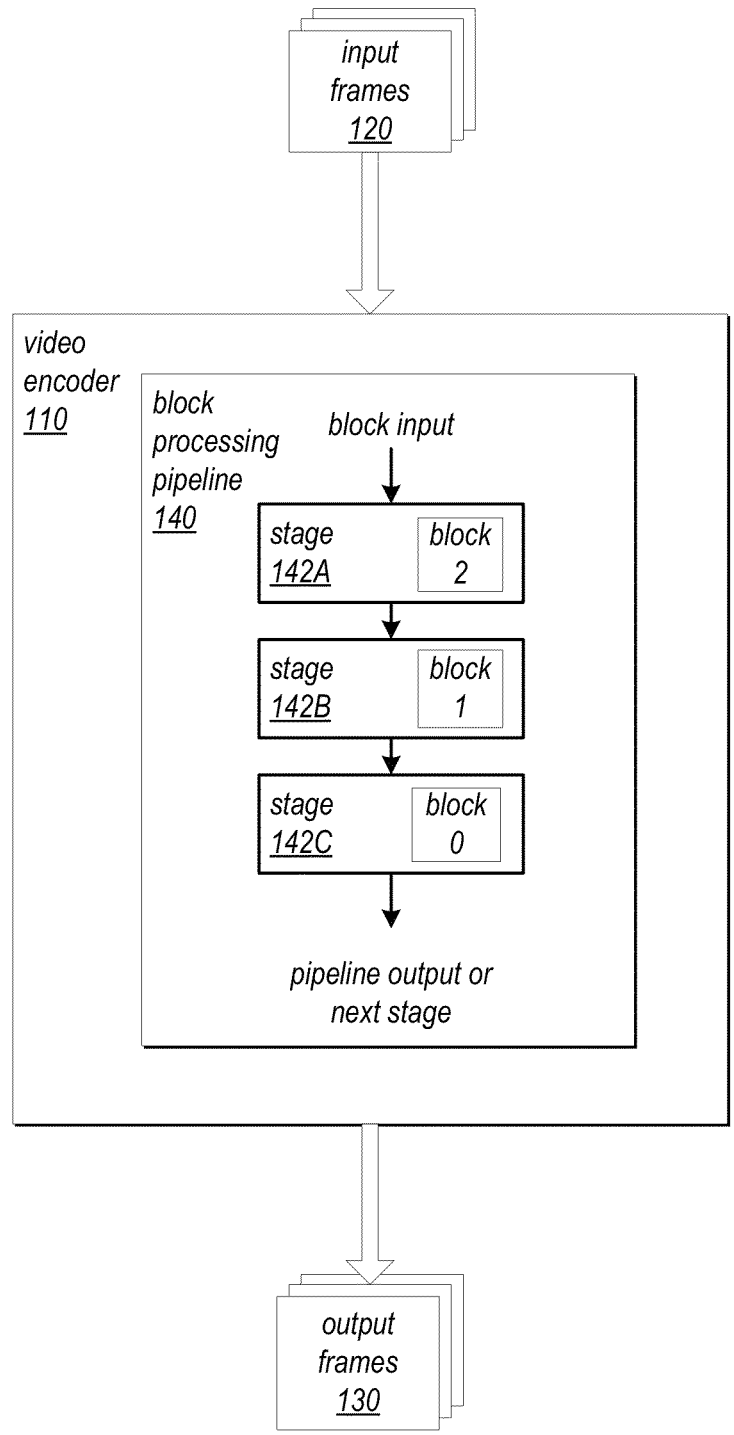
FIG. 1 illustrates an example video encoder including a conventional block processing pipeline that processes blocks from input frames in scan order.
Figure 2:
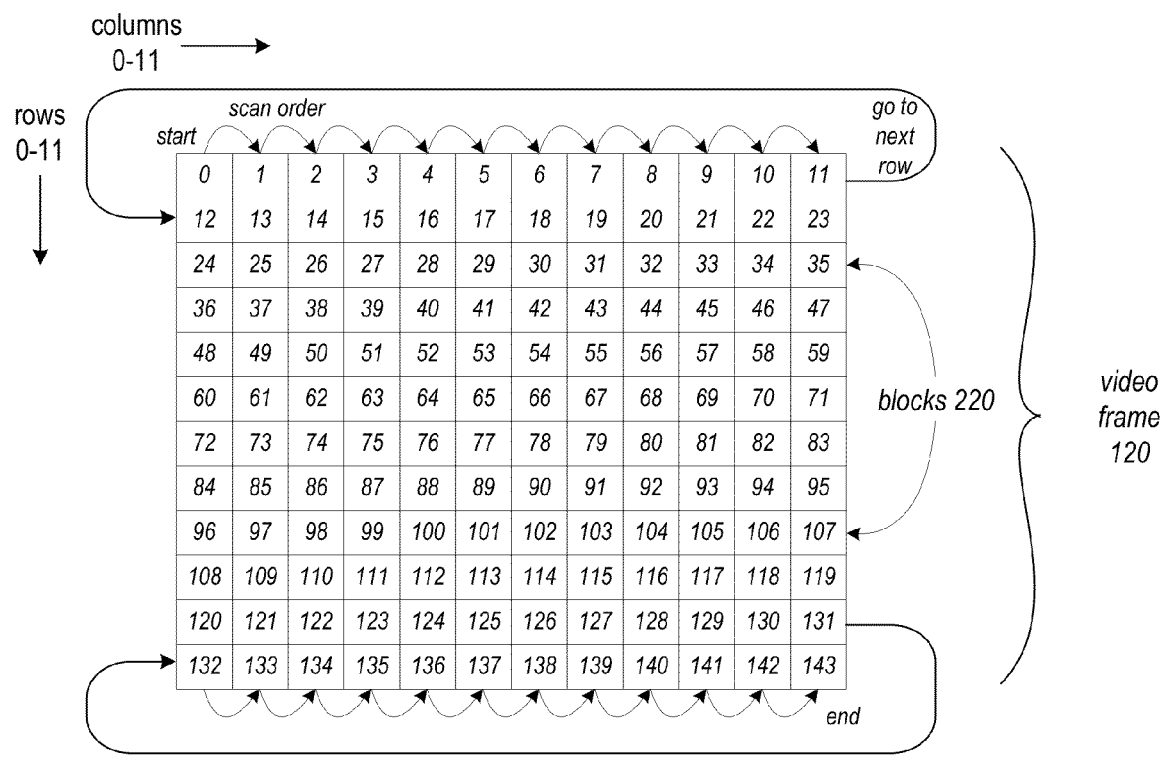
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 10:
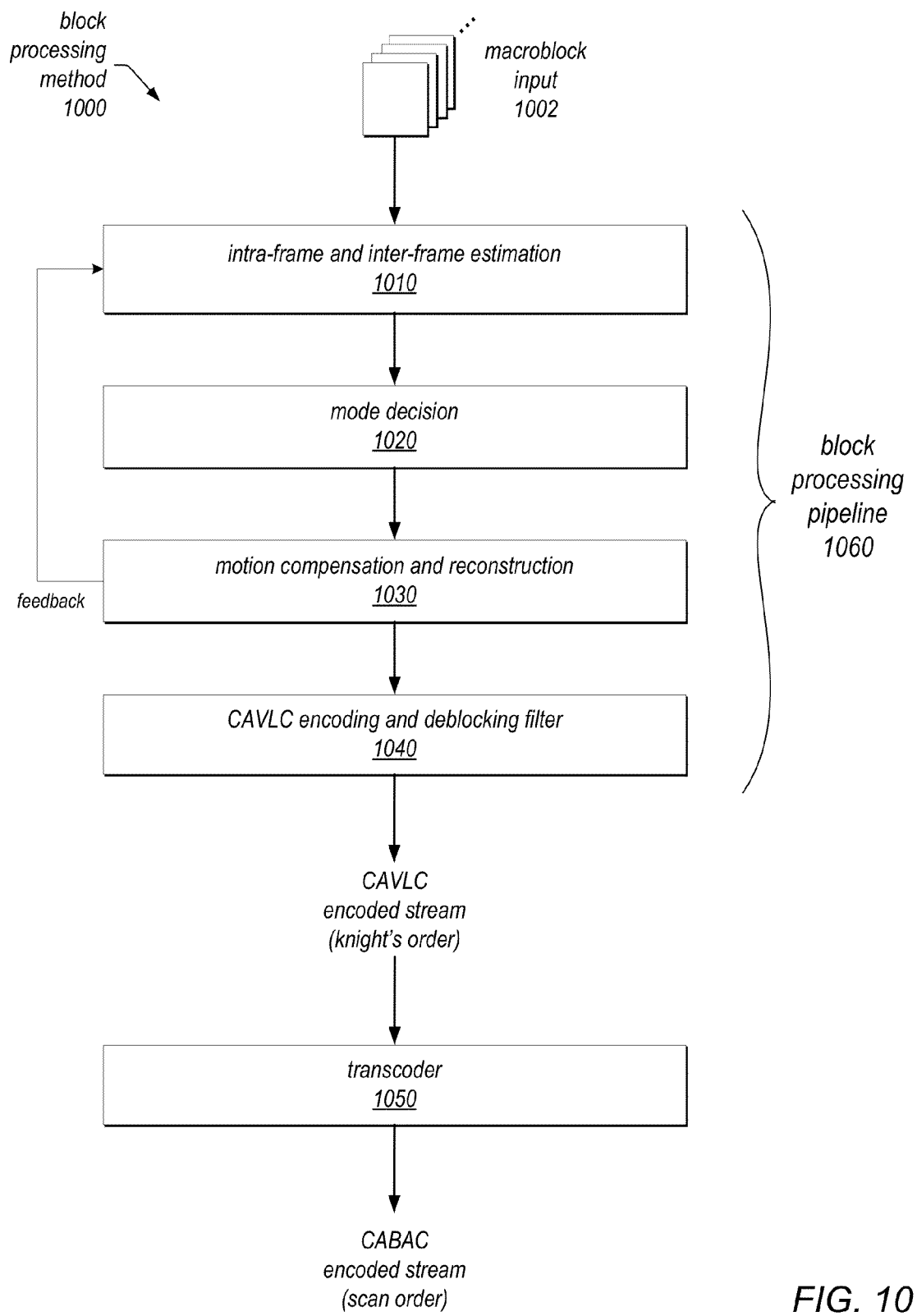
FIG. 10 is a high-level block diagram of general operations in an example block processing method that may be implemented by a block processing pipeline that implements one or more of the block processing methods and apparatus described herein, according to at least some embodiments.
Figure 17:
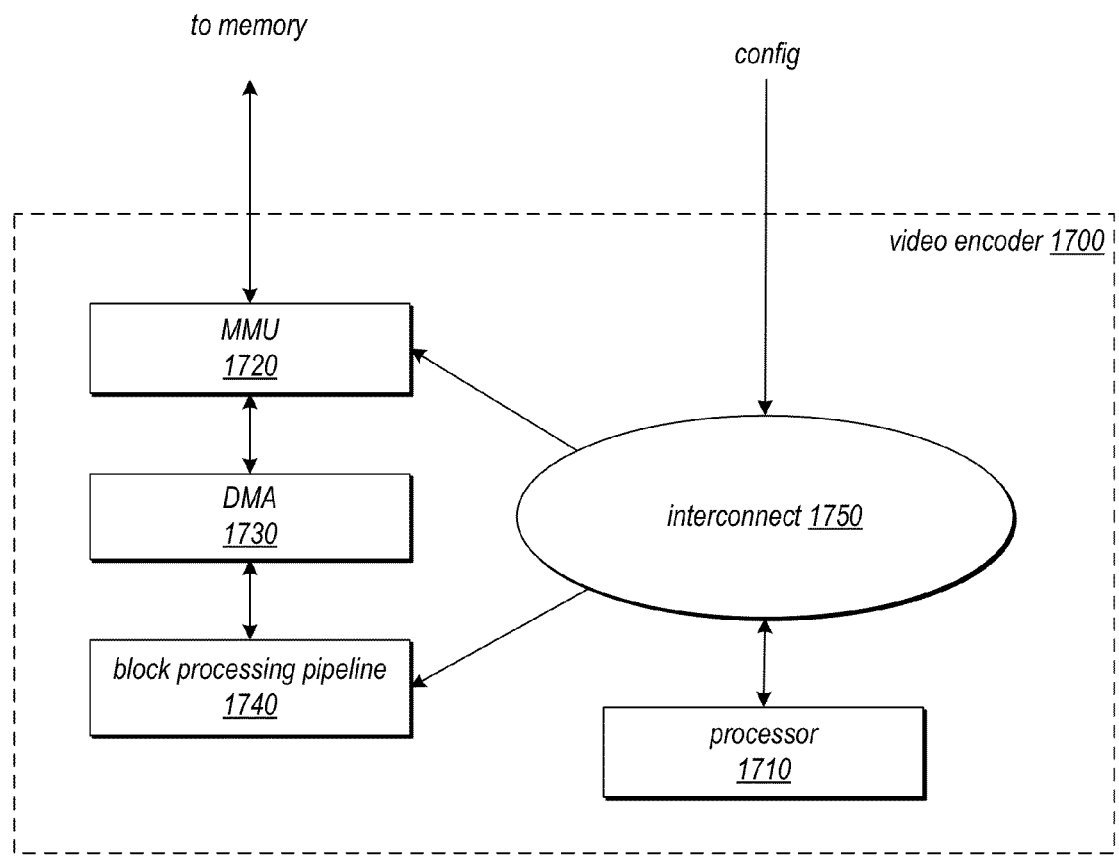
FIG. 17 is a block diagram illustrating an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 10 illustrates an example block processing pipeline of an example H.264 video encoder, and FIG. 17 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 3:
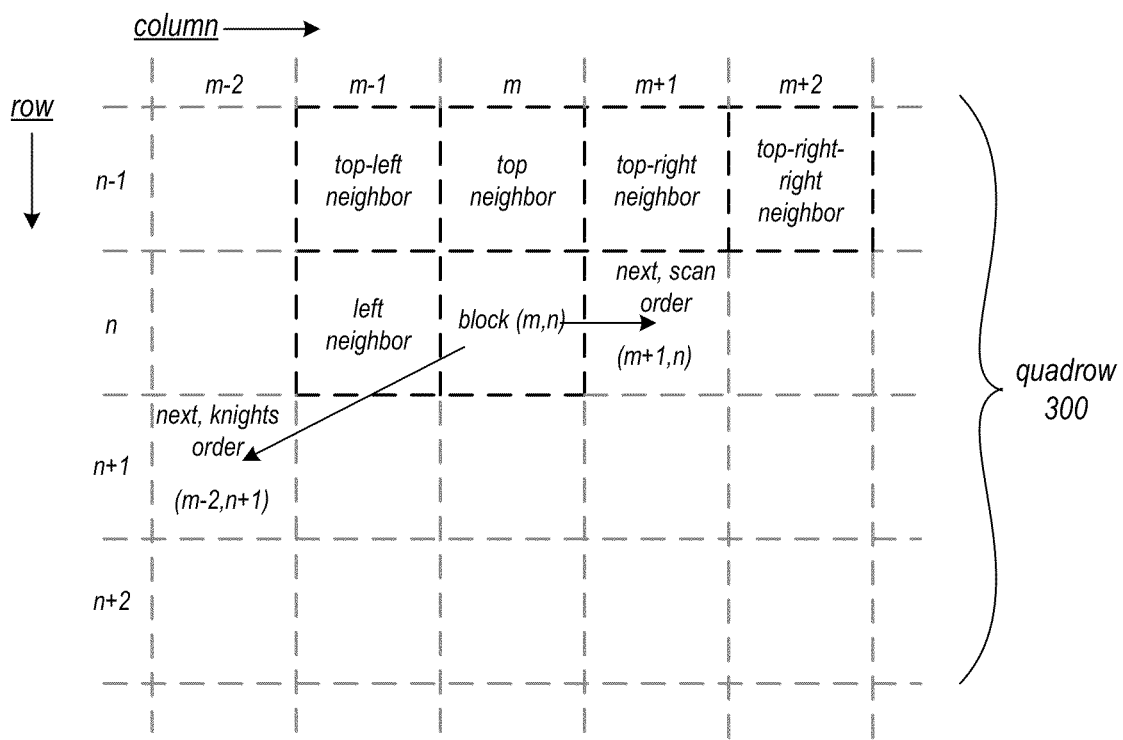
FIG. 3 illustrates neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 3 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 3, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 3 and quadrow 300, when using quadrow boundaries with knight's order processing block (m−1, n) will be four stages downstream when block (m,n) is input to the pipeline, and block (m,n) will be four stages downstream when block (m+1, n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 3. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

---
If not on the bottom row of a quadrow:
    The next block is two columns left, one row down (−2,+1).
Otherwise, at the bottom row of a quadrow:
    The next block is seven columns right, three rows up (+7,−3).
---

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

---
If not on the bottom row of a row group:
    The next block is p columns left, one row down (−p,+1).
Otherwise, at the bottom row of a row group:
    The next block is q columns right, (r−1) rows up (+q,− (r−1)).
---

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

Figure 4A:
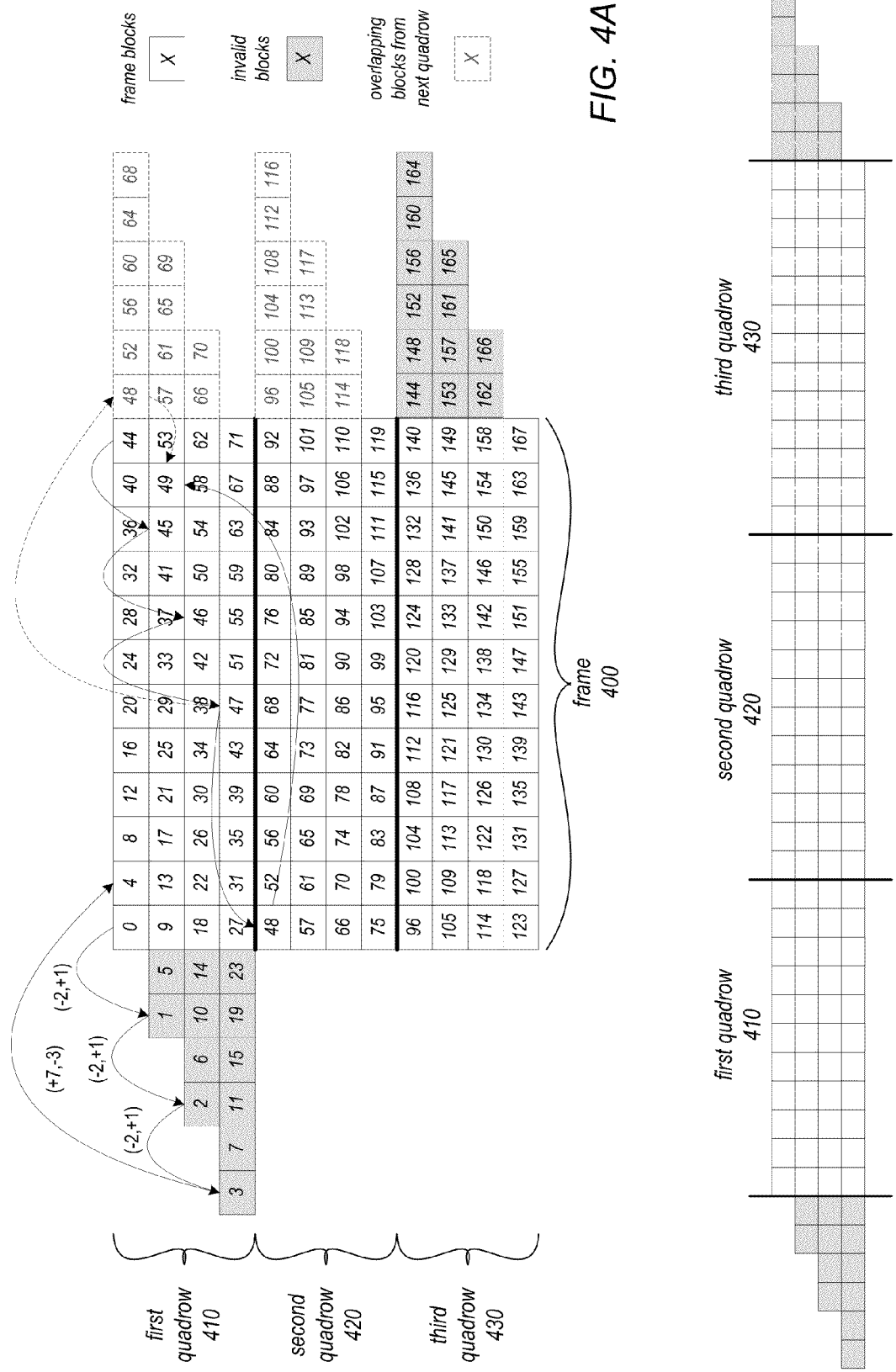
FIGS. 4A and 4B graphically illustrate the knight's order processing method including the algorithm for determining a next block, according to at least some embodiments.
Figure 4B:
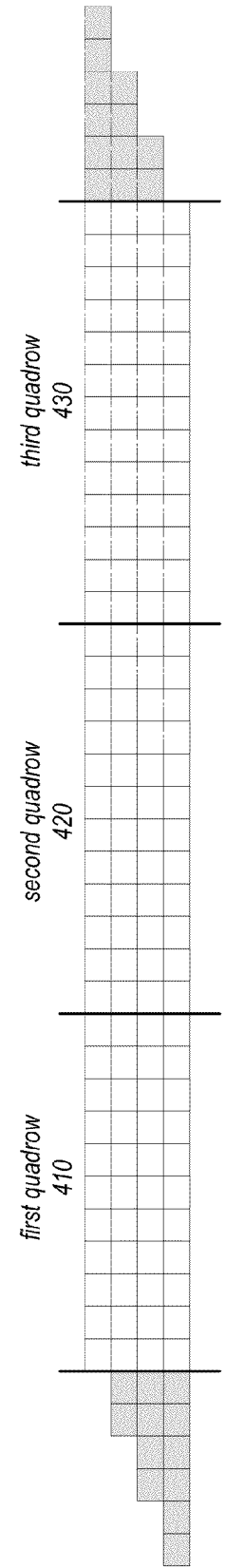

FIGS. 4A and 4B graphically illustrate the knight's order processing method, according to at least some embodiments. For simplicity, these Figures use an example 192×192 pixel frame 400 divided into 144 16×16 pixel blocks, with 12 rows and 12 columns of blocks. However, it is to be noted that the knight's order processing method can be applied to input video frames of any dimensions. In FIG. 4A, an example frame is divided into rows and columns of blocks. The rows of blocks are partitioned into three quadrows (410, 420, and 430) including four rows each. The last three rows of the first quadrow (410) are padded on the left with invalid blocks, and the first three rows of the last (third) quadrow (430) are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 4A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 4A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows 410, 420, and 430 as if they were arranged end to end, with invalid blocks at each end, as shown in FIG. 4B. Thus, the algorithm for determining a next block remains the same across the entire frame 400.

In some embodiments, each row of the first quadrow may be padded with extra invalid blocks, for example with two extra invalid blocks. Instead of beginning with the first block in the top row of the first quadrow as shown in FIG. 4A, input to the pipeline may begin with the first invalid block to the left of the first block in top row of the first quadrow.

Figure 5A:
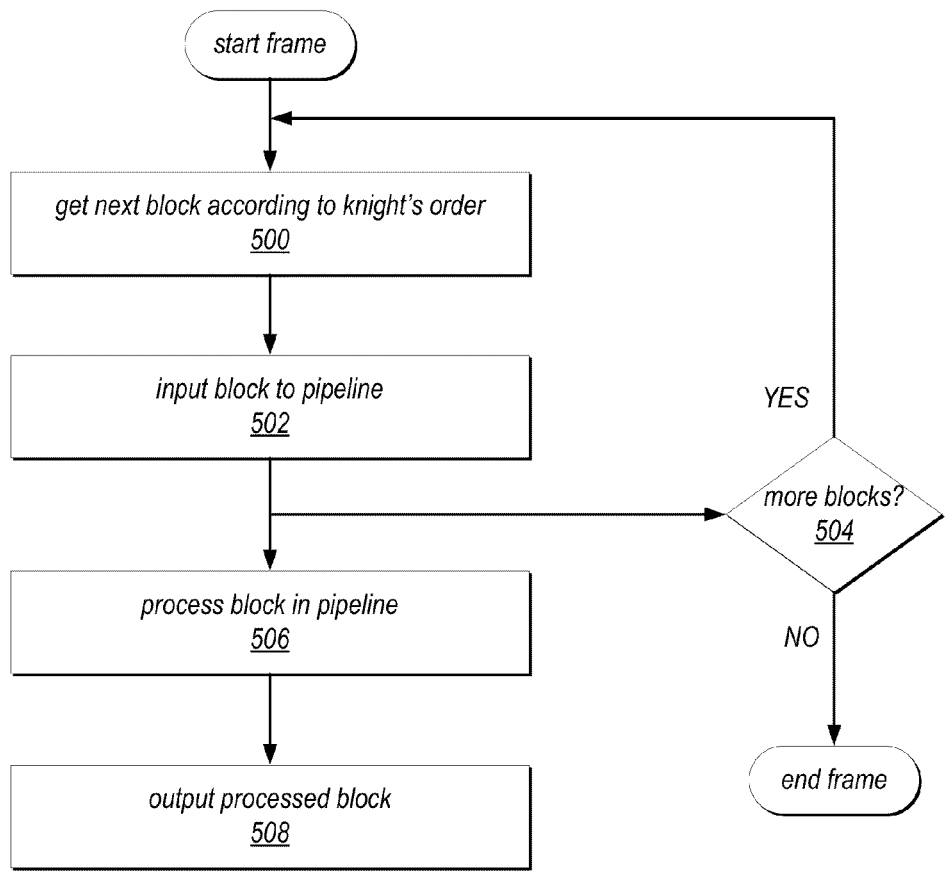
FIGS. 5A and 5B are high-level flowcharts of a knight's order processing method for a block processing pipeline, according to at least some embodiments.
Figure 5B:
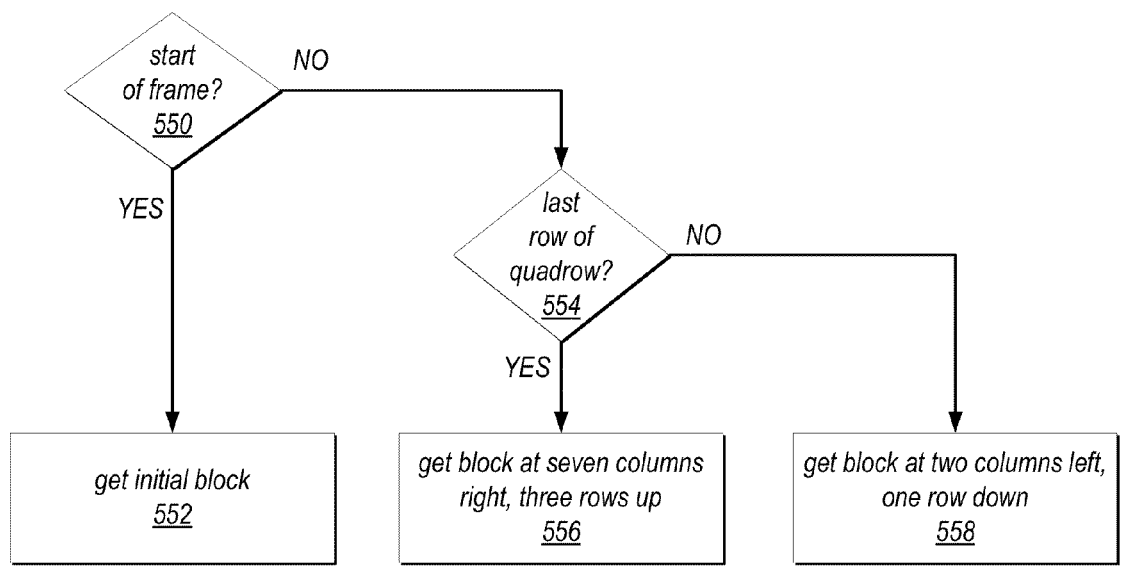

FIGS. 5A and 5B are high-level flowcharts of a knight's order processing method for a block processing pipeline, according to at least some embodiments. In FIG. 5A, as indicated at 500, a next block is determined according to the algorithm for determining a next input block that is implemented by the knight's order processing method. As indicated at 502, the block is input to the pipeline, for example from a memory via direct memory access (DMA). As shown by 504, the input process of elements 500 and 502 continues as long as there are blocks to be processed. Each block that is input to the pipeline by elements 500 and 502 is processed in the pipeline, as indicated at 506. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 508, once a block has been processed by a last stage of the pipeline, the processed block is output, for example to a memory via direct memory access (DMA).

FIG. 5B is a flowchart of an example algorithm for determining a next input block that may be implemented by the knight's order processing method, and expands on element 500 of FIG. 5A. FIG. 5B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 550, if at the start of the frame, the method gets an initial block as indicated at 552. If this is not the start of the frame, then at 554, if this is the last row of the quadrow, the next block is seven columns right, three rows up, as indicated at 556. If this is not the last row of the quadrow, the next block is two columns left, one row down, as indicated at 558.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow constraints provides locality of neighbor information that may be leveraged to provide local caching of neighbor data at each stage of the pipeline in relatively small local buffers. For example, in some embodiments, the cached neighbor data may include source transform coefficients (e.g., DC transform coefficients), modified transform coefficients, previously computed quantization errors, and/or weighting coefficient values for one or more neighbor pixels. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 6:
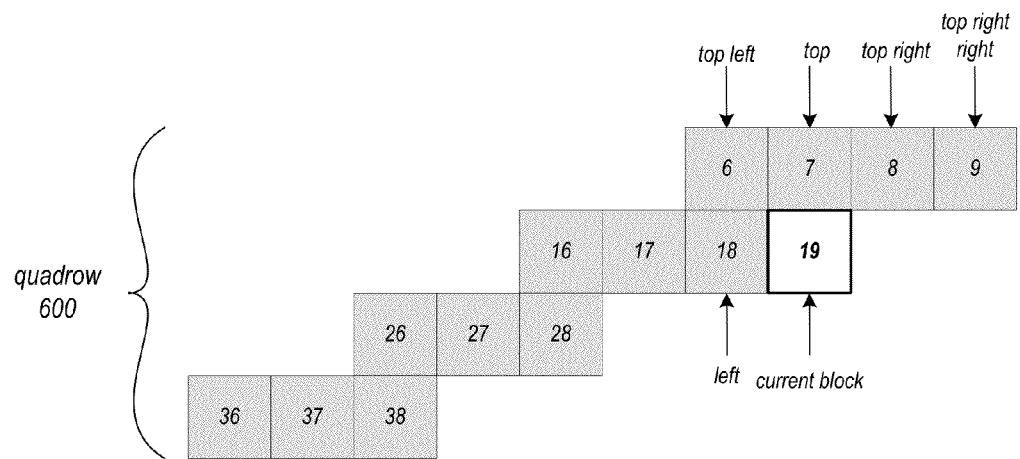
FIG. 6 illustrates a portion of a quadrow as processed in a pipeline according to the knight's order processing method that may be cached in the current quadrow buffer, according to at least some embodiments FIG. 7 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 6 shows a portion of a quadrow 600 as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 7:
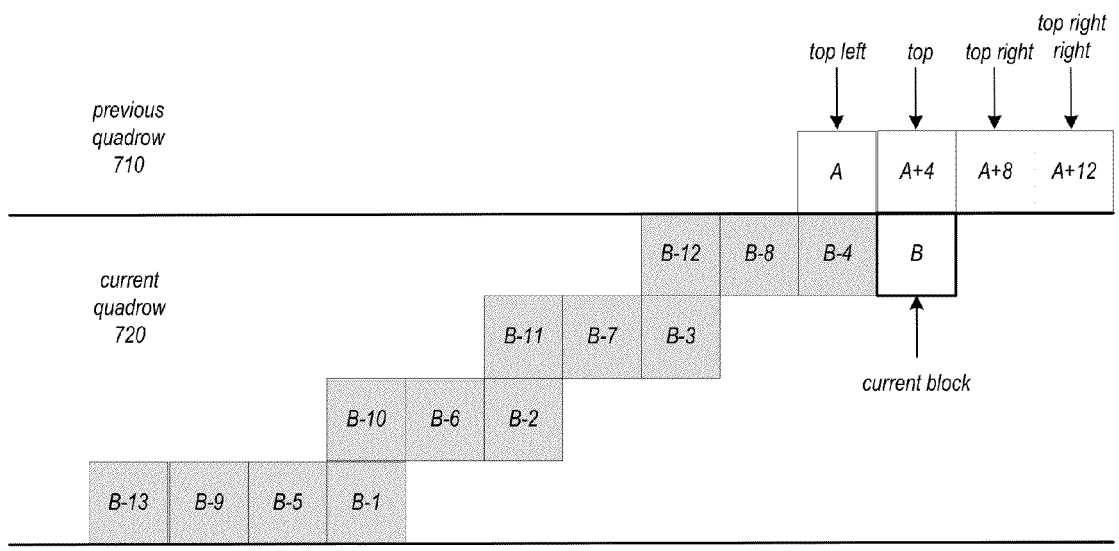

FIG. 7 graphically illustrates blocks in a current quadrow 720 being processed according to the knight's order processing method, as well as neighbor blocks in the last row of the previous quadrow 710, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 8:
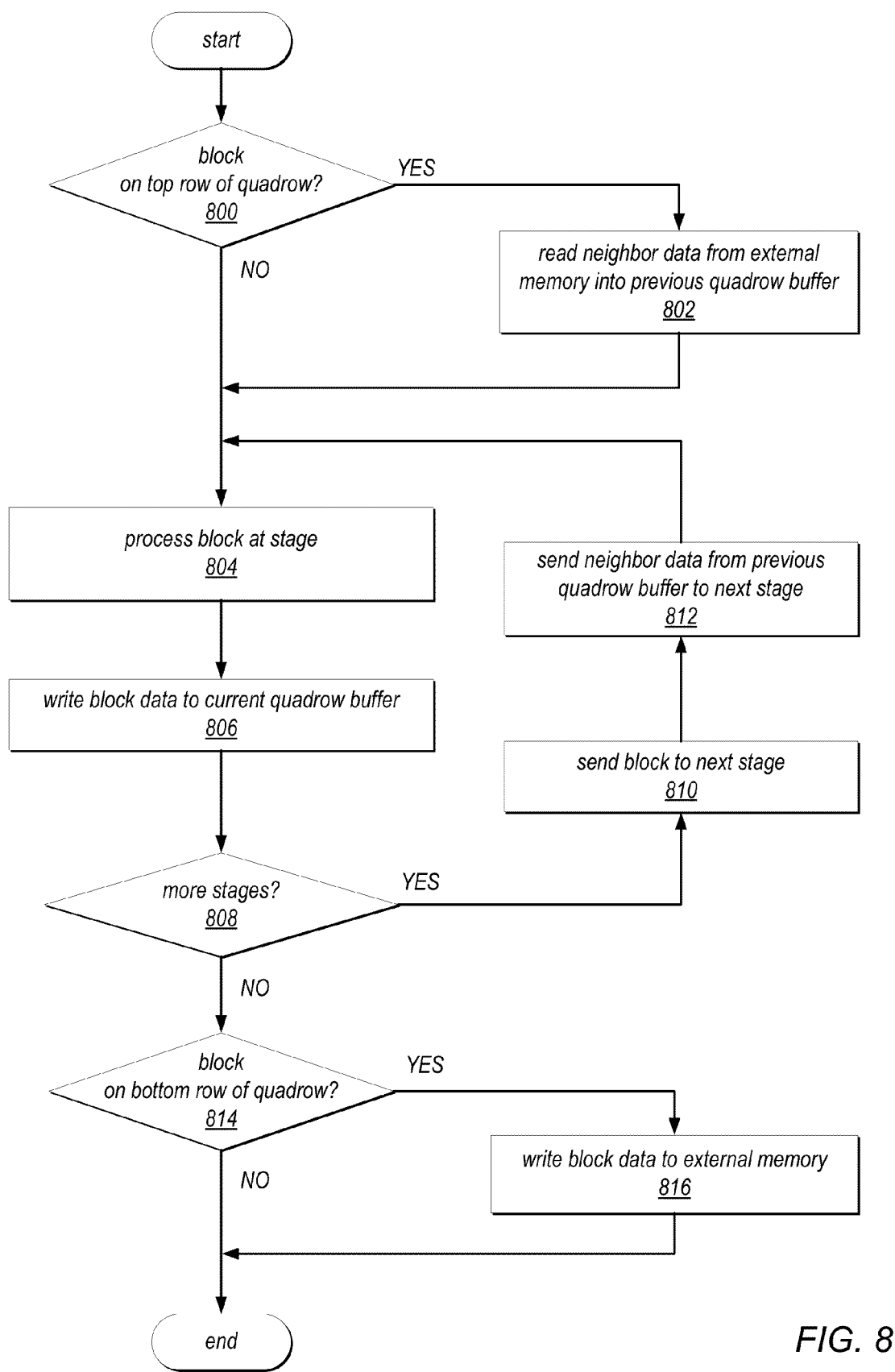
FIG. 8 is a flow diagram illustrating a method for processing blocks in a block processing pipeline in which neighbor data is cached in local buffers at the stages of the pipeline, according to at least some embodiments.

FIG. 8 is a flow diagram illustrating a method for processing blocks in a block processing pipeline in which neighbor data is cached in local buffers at the stages of the pipeline, according to at least some embodiments. For example, the method of FIG. 8 may be used at element 506 of FIG. 5A to process blocks input to the pipeline according to the knight's order processing method as shown at elements 500, 502, and 504 of FIG. 5A. In FIG. 8, a block is input to the pipeline. At 800, at a first stage of the pipeline, if the block is on the top row of a quadrow, then neighbor data for the block may be read from external memory (for example, via DMA) into a previous quadrow buffer as indicated at 802. In at least some embodiments, the neighbor data corresponds to the top-right-right neighbor of the current block on the bottom row of the previous quadrow. As indicated at 804, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 806, information about the current block may be written to the current quadrow buffer at the stage for use on subsequent blocks. The information may overwrite an oldest entry in the current quadrow buffer.

At 808, if there are more stages, then the block may be sent to a next stage, as indicated at 810. At 812, neighbor information from the previous quadrow buffer may also be sent to the next stage. In at least some embodiments, this neighbor information is only sent to the next stage if the current block is on the top row of a quadrow. Elements 804 through 812 may be repeated until the block reaches and is processed by a last stage of the pipeline. At 808, if there are no more stages, then processing of the block in the pipeline is done. At 814, if the block is on the bottom row of a quadrow, then information for the block is written to an external memory (for example, via DMA) to be read as neighbor data for blocks in the top row of a next quadrow. In addition, all of the processed valid blocks are output as shown by element 508 of FIG. 5A.

Example Pipeline Units

Figure 9A:
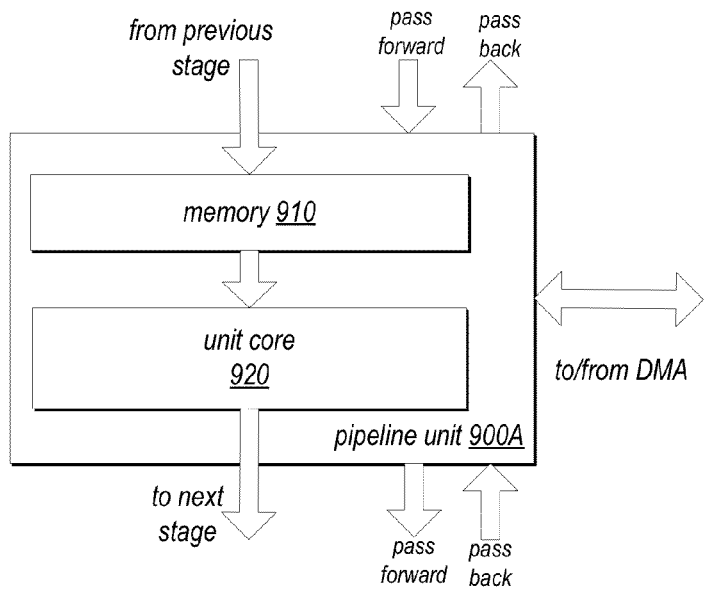
FIGS. 9A and 9B are block diagrams of example pipeline processing units that may be used at the stages of a block processing pipeline that implements one or more of the block processing methods and apparatus as described herein, according to at least some embodiments.
Figure 9B:
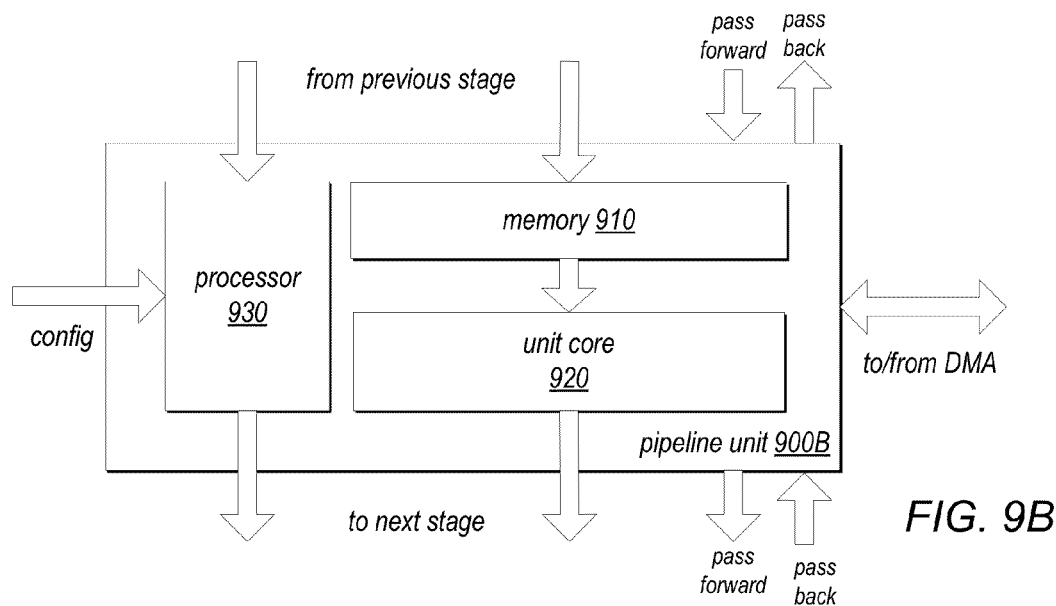
Figure 9C:
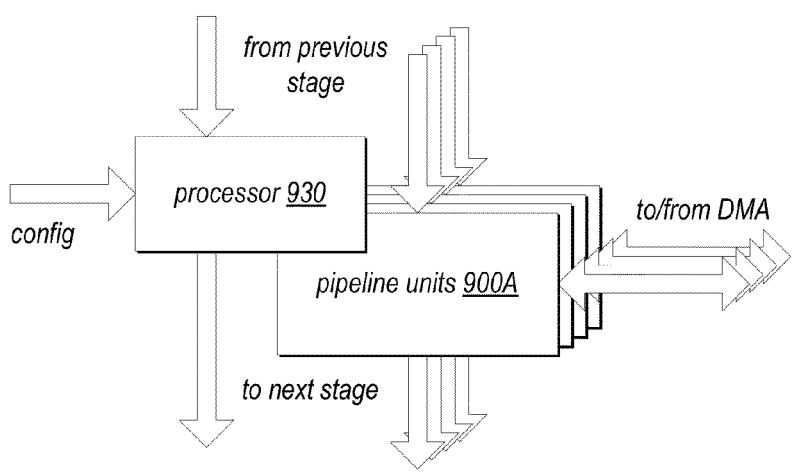
FIG. 9C illustrates that a single processor may be associated with a group of two or more pipeline units, according to at least some embodiments.

FIGS. 9A through 9C are block diagrams of example pipeline processing units that may be used at the stages of a block processing pipeline that implements one or more of the block processing methods and apparatus as described herein, according to at least some embodiments. For example, one or more of pipeline units 900A and/or 900B as shown in FIGS. 9A and 9B may be used at each stage of the example block processing pipeline shown in FIG. 10. Note that FIGS. 9A through 9C are not intended to be limiting; a pipeline processing unit may include more or fewer components and features than those shown in the Figures.

As shown in FIG. 9A, a pipeline unit 900A may include at least a memory 910 and a unit core 920. Unit core 920 may be a component (e.g., a circuit) that is configured to perform a particular operation on or for a block, or a portion of a block, at a particular stage of the block processing pipeline. Memory 910 may, for example, be a double-buffered memory that allows the unit core 920 to read and process data for a block from the memory 910 while data for a next block is being written to the memory 910 from a previous pipeline unit.

As shown in FIG. 9B, a pipeline unit 900B, in addition to a memory 910 and unit core 920 as shown in FIG. 9A, may also include a processor 930. Processor 930 may, for example, be a mobile or M-class processor. The processors 930 in pipeline units 900B of a block processing pipeline may, for example, be used to control the block processing pipeline at block boundaries. The processors 930 in pipeline units 900B may be configurable, for example with low-level firmware microcode, to allow flexibility in algorithms that are implemented by the block processing pipeline for various applications. In at least some embodiments, a processor 930 of a pipeline unit 900B in the pipeline may be configured to receive data from a processor 930 of a previous (upstream) pipeline unit 900B and send data to a processor 930 of a subsequent (downstream) pipeline unit 900B. In addition, a processor 930 of a pipeline unit 900B at a last stage of the pipeline may be configured to send feedback data to a processor 930 of a pipeline unit 900B at a first stage of the pipeline.

As shown in FIGS. 9A and 9B, a pipeline unit 900A or 900B may be configured to access external memory, for example according to direct memory access (DMA). In addition, a pipeline unit 900A or 900B may be configured to pass information back to one or more previous (upstream) stages of the pipeline and/or to receive information passed back from one or more subsequent (downstream) stages of the pipeline. In addition, a pipeline unit 900A or 900B may be configured to pass information forward to one or more subsequent (downstream) stages of the pipeline and/or to receive information passed forward from one or more previous (upstream) stages of the pipeline.

As shown in FIG. 9C, two or more units 900A as shown in FIG. 9A may be grouped together and configured to perform an operation in the pipeline. A single processor 930 may be used to control and/or configure the pipeline units 900A.

Example Block Processing Pipeline

FIG. 10 is a high-level block diagram of general operations in an example block processing method 1000 for H.264 encoding that may be implemented in stages by a block processing pipeline that may implement one or more of the block processing methods and apparatus as described herein, according to at least some embodiments. A block processing pipeline that implements the block processing method 1000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920×1080 pixels, 2.1 megapixels) encoded in YCbCr color space. However, other input video formats may be encoded into H.264 using embodiments of the pipeline in a video encoder apparatus.

Figure 18:
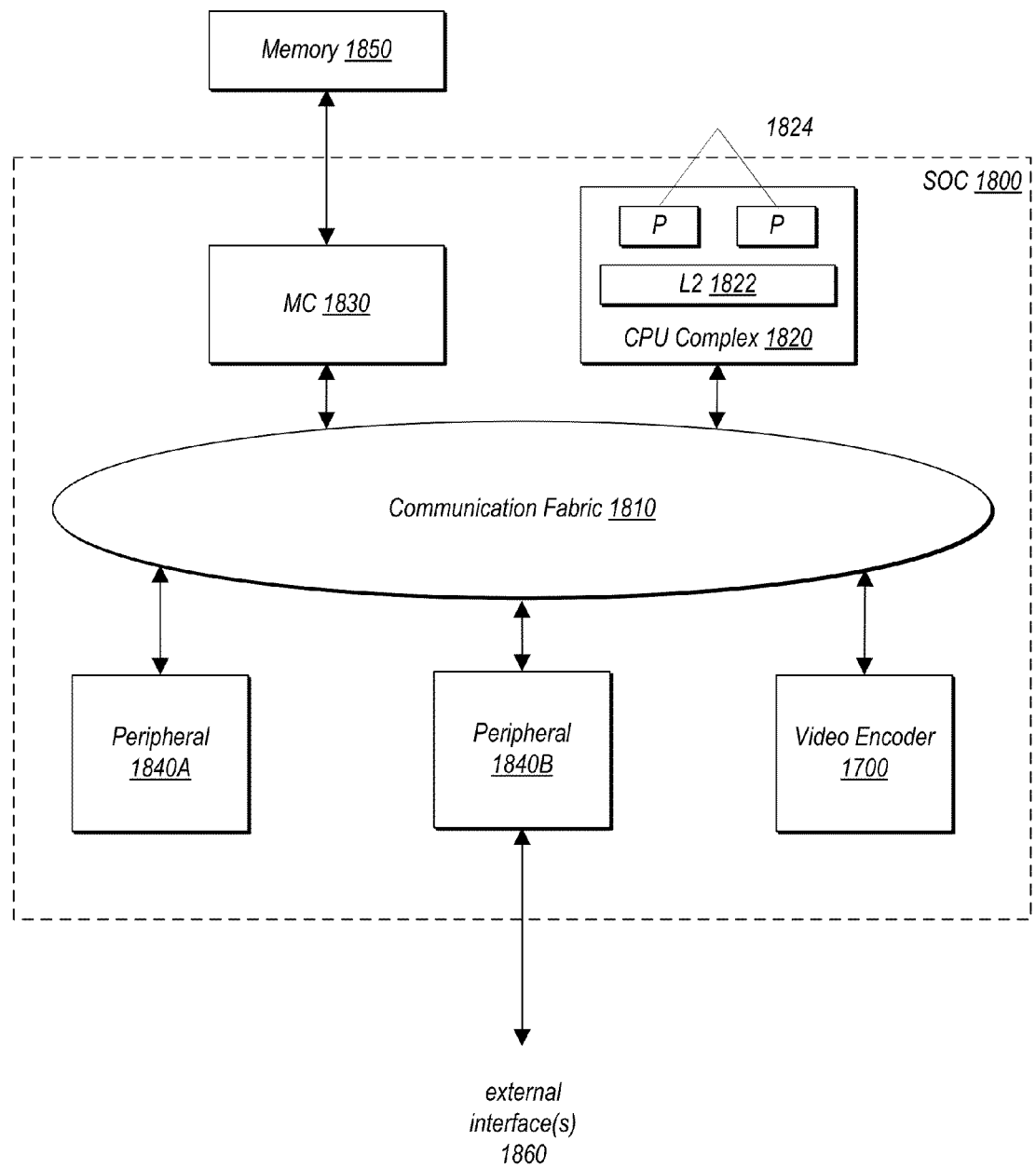
FIG. 18 is a block diagram illustrating one embodiment of a system on a chip (SOC) that includes a video encoder.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 10, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 17. An example SOC that includes a video encoder apparatus is illustrated in FIG. 18. While embodiments are generally described in relation to hardware implementations of a block processing pipeline that implements the block processing method 1000 with knight's order processing, note that the block processing method 1000 with knight's order processing may be implemented by a block processing pipeline implemented in software.

A pipeline that implements the method 1000 as shown in FIG. 10 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1000 as shown in FIG. 10 that may be performed in stages by a pipeline, as well as general data flow through the pipeline, are briefly described below. Each of the general operations of the method 1000 may be implemented by one or more pipeline units at one or more stages of the pipeline. Example pipeline units are illustrated in FIGS. 9A through 9C. Also note that each general operation shown in FIG. 10 may be subdivided into two or more operations that may be implemented by pipeline units at one, two, or more stages of the pipeline. However, two or more of the operations shown in FIG. 10 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 10 and described below.

Macroblock Input

In at least some embodiments, macroblock input 1002 may be performed by an initial stage of the pipeline. In at least some embodiments, macroblock input 1002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 1002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 1010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1010 operations may be subdivided into two or more sub-operations that may be performed at one, two, or more stages of the pipeline, with one or more components or pipeline units at each stage configured to perform a particular sub-operation.

In at least some embodiments, macroblock input 1002 reads neighbor data from the bottom row of a previous quadrow from memory at quadrow boundaries and passes the neighbor data to intra-frame and inter-frame estimation 1010, for example to an intra-frame estimation component. In addition, motion compensation and reconstruction 1030, for example a luma reconstruction component, may pass neighbor data as feedback to intra-frame and inter-frame estimation 1010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 1020.

In at least some embodiments, motion estimation may also include a direct mode estimation component that receives co-located and spatial motion vector data and computes a direct/skip mode cost, which it provides to mode decision 1020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1020.

In at least some embodiments, macroblock input 1002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 1020 may be implemented by a mode decision component at a stage of the pipeline that is downstream of the stage(s) that implement intra-frame and inter-frame estimation 1010 operations. However, in some embodiments, mode decision 1020 operations may be subdivided into two or more sub-operations that may be performed at one, two, or more stages of the pipeline, with one or more components or pipeline units at each stage configured to perform a particular sub-operation. In at least some embodiments, the mode decision 1020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, subpartitions, prediction direction and reference frame indices. In at least some embodiments, the mode decision 1020 component also performs all motion vector prediction. The motion vector prediction results may be used when estimating motion vector rate during mode decision. In at least some embodiments, the motion vector prediction results may also be fed back from the mode decision 1020 component to motion estimation, for example for use in direct mode estimation and motion vector rate estimation.

Motion Compensation and Reconstruction

In at least some embodiments, motion compensation and reconstruction 1030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1030 may be subdivided into luma motion compensation and reconstruction and chroma motion compensation and reconstruction. In at least some embodiments, each of these sub-operations of motion compensation and reconstruction 1030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component (or an FTQ block thereof). The coefficient data is sent to an ITQ technique implemented by the luma reconstruction component (or an ITQ block thereof), and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1010 for prediction of future blocks inside the current macroblock.

Luma Reconstruction Component

Figure 11:
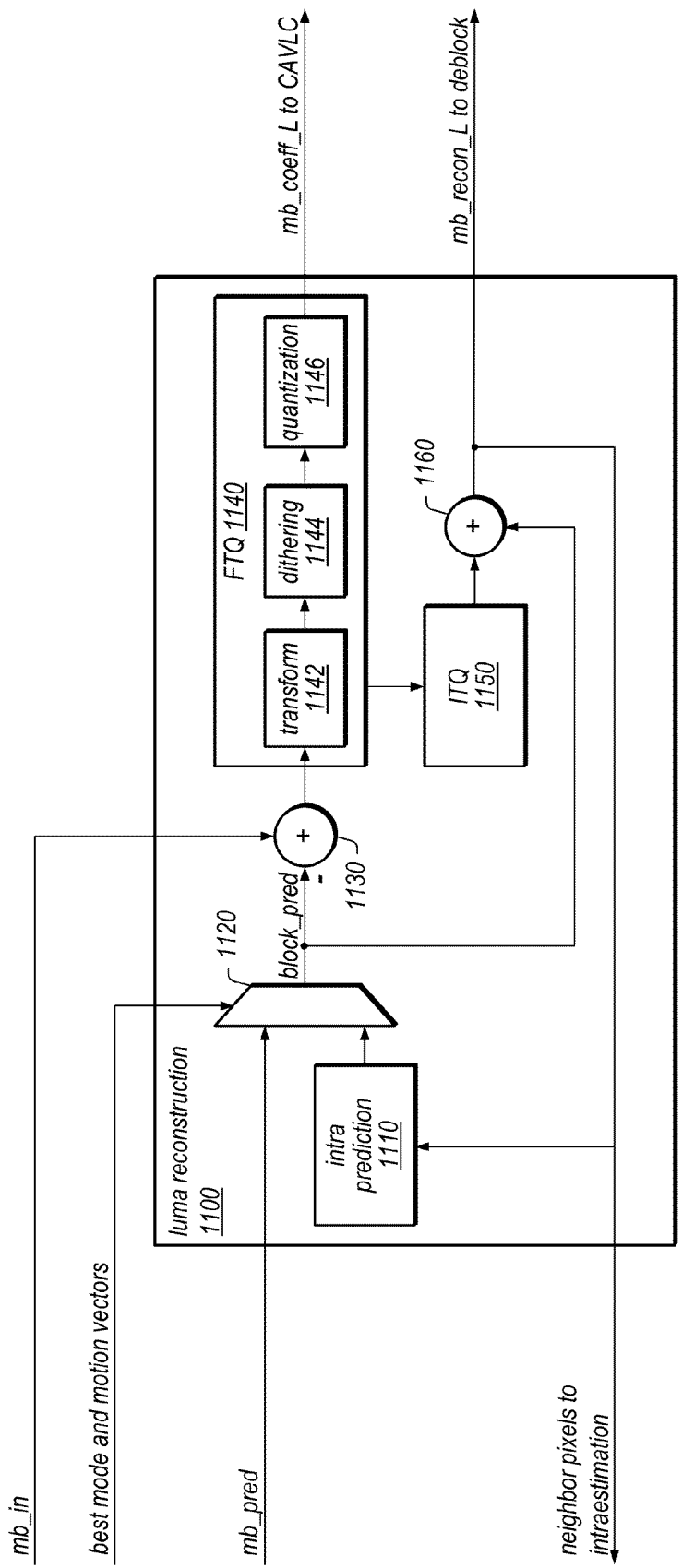
FIG. 11 is a block diagram illustrating a luma reconstruction component of a video encoding apparatus, according to at least some embodiments.

One embodiment of a luma reconstruction component of a video encoding apparatus is illustrated by the block diagram in FIG. 11. In this example, a selection element 1120 of a luma reconstruction component 1100 may, based on the best mode and motion vectors received from the mode decision operation, select either an inter prediction macroblock from the luma motion compensation component (shown as mb_pred) or a prediction block generated by an intra prediction operation of the luma reconstruction component 1100 (e.g., by intra prediction block 1110) as a prediction block for an input macroblock. As illustrated in this example, an element 1130 may be configured to subtract the spatially co-located input macroblock (shown as mb_in) from the resulting prediction block (shown as block_pred) to generate a residual block of pixels, which may then be passed to an FTQ block 1140 to be transformed and quantized. As described herein, in some embodiments, the FTQ block 1140 may be configured to apply a transform operation (e.g., in a transform sub-block 1142), a neighbor-data-based dithering operation (e.g., in a dithering sub-block 1144), and a quantization operation (e.g., in a quantization sub-block 1146) in the illustrated order. The collective result of these operations (e.g., a set of modified coefficients for the macroblock) may be the coefficient data for the luma component of the macroblock that is sent downstream to CAVLC encoding (shown as mb_coeff_L).

As illustrated in this example, the collective result of transform, dithering, and quantization operations may also be provided to an inverse transform quantization (ITQ) block 1150 (which may subsequently generate a reconstructed residual pixel block). In addition, the prediction data may also be preserved, e.g., to be subsequently used to generate reconstructed pixels. For example, an element 1160 may be configured to add the prediction block (pred block) to the residual block (the output of ITQ block 1150) to generate pixels of the reconstructed block (shown as mb_recon_L), which may be passed downstream to the deblocking filter. As illustrated in this example, the reconstructed pixels may also be passed back to the intra estimation component (e.g., to neighbor pixel memory) for use in the prediction of future blocks inside the current macroblock.

In some embodiments, the FTQ block may be configured to apply different transforms to the macroblock data it receives at its input, depending on the mode. For example, for intra modes, different transforms can be used depending on the specific intra mode. In one intra mode, a 4×4 transform may be applied on 4×4 blocks within a macroblock, and the FTQ-ITQ operations may be performed in block order. As described above, in this mode, the transformed, dithered, and quantized coefficients that are output from the FTQ block may be passed to the CAVLC unit, and to the ITQ block; the predicted block may be provided to the ITQ block; and the reconstructed pixels may be passed back to intra prediction and to the deblock unit. Similarly, in another intra mode, an 8×8 transform may be applied on 8×8 blocks within a macroblock, and the FTQ-ITQ operations may be performed in block order. As in the previous example, in this mode, the transformed, dithered, and quantized coefficients that are output from the FTQ block may be passed to the CAVLC unit, and to the ITQ block; the predicted block may be provided to the ITQ block; and the reconstructed pixels may be passed back to intra prediction and to the deblock unit.

In yet another intra mode (e.g., a 16×16 intra mode), a hierarchical transform may be applied. In this example, the 4×4 transform described above is applied to 16 4×4 blocks within a macroblock, but the DC coefficient (the top left coefficient, which is known as the DC coefficient for historical reasons due to it being zero frequency) is not quantized. Subsequently, the DC coefficient of each 4×4 block is extracted to create a 4×4 block of DC coefficients for the macroblock. These DC coefficients are then transformed, dithered, and quantized using the same 4×4 transform, this time quantizing all coefficients. These 4×4 coefficients then become the new DC coefficient of each 4×4 block. As in the previous example, in this mode, the transformed, dithered, and quantized coefficients that are output from the FTQ block may be passed to the CAVLC unit, and to the ITQ block; the predicted block may be provided to the ITQ block; and the reconstructed pixels may be passed back to the deblock unit.

In some embodiments, for inter modes, the transform size may be controlled by a configurable parameter or flag. In one embodiment, the value of such a flag may indicate which of two transform sizes will be used. For example, when the flag is set, an 8×8 transform may be applied, otherwise a 4×4 transform may be used. In some embodiments, the 4×4 and 8×8 transforms may be the same for intra and inter modes. Note that for inter modes, the macroblock right column and bottom row of reconstructed pixels may also be passed to intra estimation for subsequent use in predicting future macroblocks.

In some embodiments, the video encoders described herein (or more specifically, the FTQ operations in the luma reconstruction components of those video encoders) may support scaling lists and/or programmable rounding offsets. For example, in some embodiments, the process of quantization may be summarized as follows:

$$qcoeff = \left(\frac{coeff + RO}{quant}\right)$$

In this example, qcoeff represents the quantized coefficient (i.e., the result of the quantization operation), coeff represents the input to the quantization operation (e.g., the collective result of the transform and dithering operations), RO represents a programmable rounding offset, and quant represents the quantizer step size used. In some embodiments, the quantizer may include a combination of transform scaling, a macroblock quantization parameter, and a scaling coefficient from a scaling list. In some embodiments, the rounding offset may be selected based on the transform type (e.g., 4×4, 8×8 or 16×16), the mode type (e.g., intra mode or inter mode) and/or the coefficient type (e.g., DC or AC coefficient). In one example, the rounding offset may be defined as a fraction of quant between 0 and 1.0. In this example, the scaling list may be selected based on the macroblock type.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including sub-pixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. Referring again to FIG. 10, in at least some embodiments, reference data may be read based on mode decision 1020 results. The chroma motion compensation component performs subpixel interpolation to generate a prediction block. Mode decision 1020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1010 so that reconstructed pixels can be used during the estimation process. In at least some embodiments, if the best mode is an intra mode, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

Chroma Reconstruction Component

In some embodiments, the chroma reconstruction component is similar to the luma reconstruction component described above. For example, it may include intra and inter prediction, and FTQ/ITQ blocks. However, the prediction modes and FTQ/ITQ processing units used for chroma reconstruction may be different than those used for luma reconstruction. One embodiment of a chroma reconstruction component of a video encoding apparatus is illustrated by the block diagram in FIG. 12. As illustrated in this example, a selection element 1230 of a chroma reconstruction component 1200 may, based on the best mode received from the mode decision operation, select either an inter prediction macroblock read from the chroma cache (shown in FIG. 12 as chroma reference) or a prediction block generated by an intra prediction operation of the chroma reconstruction component 1200 (e.g., by chroma intra prediction block 1220) as a prediction block for an input macroblock. In some embodiments, chroma intra prediction may be performed using one of several different intra chroma modes.

Note that in some embodiments, chroma intra prediction may be dependent upon neighbor data (e.g., information about neighbor pixels above and to the left of pixels currently being processed, as shown in element 1210). For example, the chroma intra prediction component may perform intra prediction for Cb and Cr chroma blocks when the chroma format is 4:2:0 or 4:2:2 for intra macroblocks based on the chroma prediction modes. In some such embodiments, neighbor pixels may be extracted from outside macroblock pixel arrays for Cb and Cr blocks. For example, top left, top, and left pixels may be used for chroma intra prediction, and the 17 or 25 neighbor pixels (for 4:2:0 or 4:2:2, respectively) may be used to generate the intra chroma prediction blocks based on the input chroma modes.

For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

Figure 12:
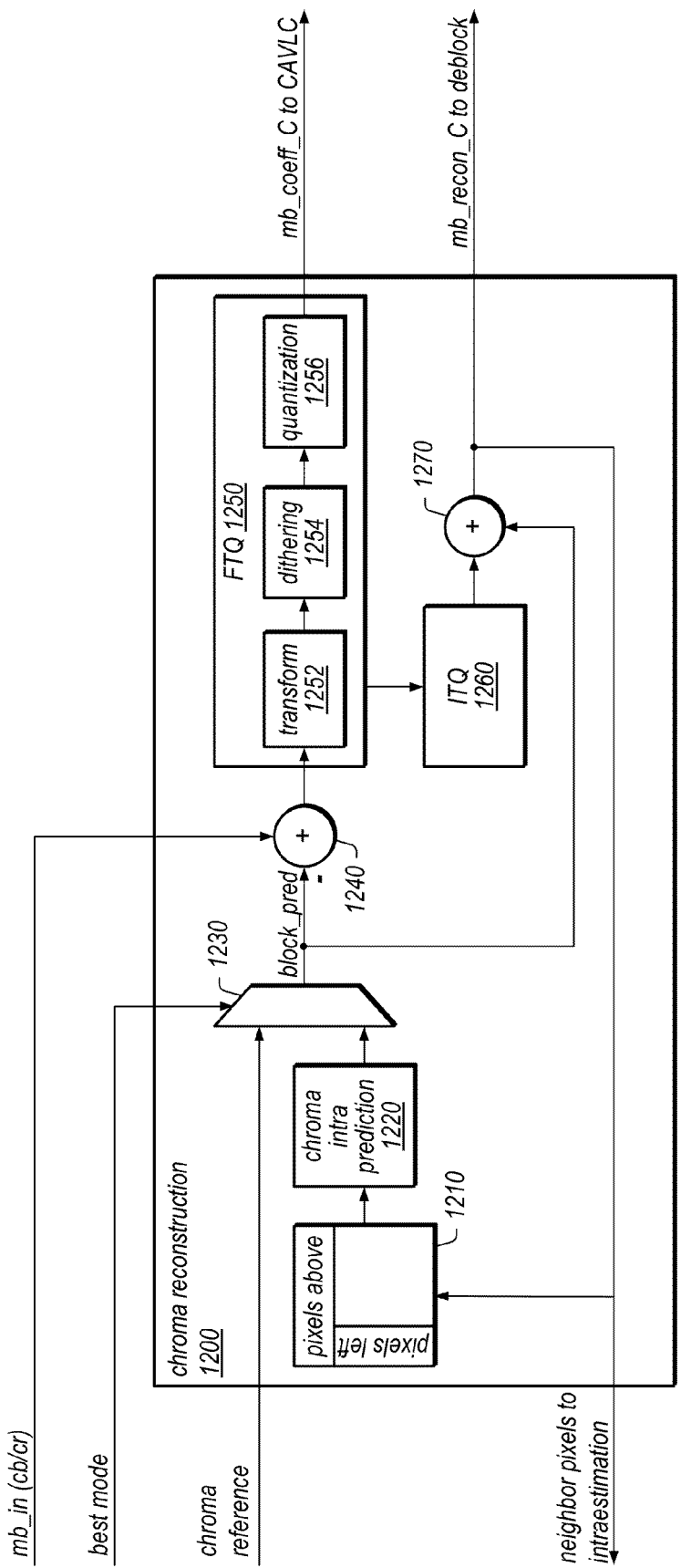
FIG. 12 is a block diagram illustrating a chroma reconstruction component of a video encoding apparatus, according to at least some embodiments.

As illustrated in FIG. 12, an element 1240 of chroma reconstruction component 1200 may be configured to subtract the spatially co-located input macroblock (shown as mb_in) from the resulting prediction block (shown as block_pred) to generate a residual block of pixels, which may then be passed to an FTQ block 1250 to be transformed and quantized. As described herein, in some embodiments, the FTQ block 1250 may be configured to apply a transform operation (e.g., in a transform sub-block 1252), a neighbor-data-based dithering operation (e.g., in a dithering sub-block 1254), and a quantization operation (e.g., in a quantization sub-block 1256), in turn, the collective result of which may be the coefficient data for the chroma component that is sent downstream to CAVLC encoding (shown as mb_coeff_C) and to the inverse transform quantization (ITQ) block 1260 (which may generate the reconstructed residual pixel block).

As illustrated in this example, the prediction data may also be preserved, e.g., to be subsequently used to generate reconstructed pixels. For example, an element 1270 may be configured to add the prediction block (pred_block) to the residual block (the output of ITQ block 1260) to generate pixels of the reconstructed block (shown as mb_recon_C), which may be passed downstream to the deblocking filter. As illustrated in this example, the reconstructed pixels may also be passed back to the intra estimation component (e.g., to neighbor pixel memory) for use in the prediction of future blocks inside the current macroblock.

As was the case for the luma reconstruction components, in some embodiments of the video encoders described herein, the FTQ operations in the chroma reconstruction components of those video encoders may support scaling lists and/or programmable rounding offsets. For example, in some embodiments, the process of quantization may be summarized as follows:

$$qcoeff = \left(\frac{coeff + RO}{quant}\right)$$

In this example, qcoeff represents the quantized coefficient (i.e., the result of the quantization operation), coeff represents the input to the quantization operation (e.g., the collective result of the transform and dithering operations), RO represents a programmable rounding offset, and quant represents the quantizer used. In some embodiments, the quantizer may include a combination of transform scaling, a macroblock quantization parameter, and a scaling coefficient from a scaling list. In some embodiments, the rounding offset may be selected based on the transform type (e.g., 4×4, 8×8 or 16×16), the mode type (e.g., intra mode or inter mode) and/or the coefficient type (e.g., DC or AC coefficient). In one example, the rounding offset may be defined as a fraction of quant between 0 and 1.0. In this example, the scaling list may be selected based on the macroblock type.

As described above, in some embodiments, the video encoders described herein may be configured to apply a transform to prediction data for a macroblock of an image frame, generating source transform coefficients for each pixel of the macroblock, to apply a neighbor-data-based dithering operation to each source transform coefficient to produce a modified transform coefficient, and to pass these modified transform coefficients to a quantization operation. This approach may reduce or effectively remove the artifacts that are typically caused by quantization in some existing video encoders.

Figure 13:
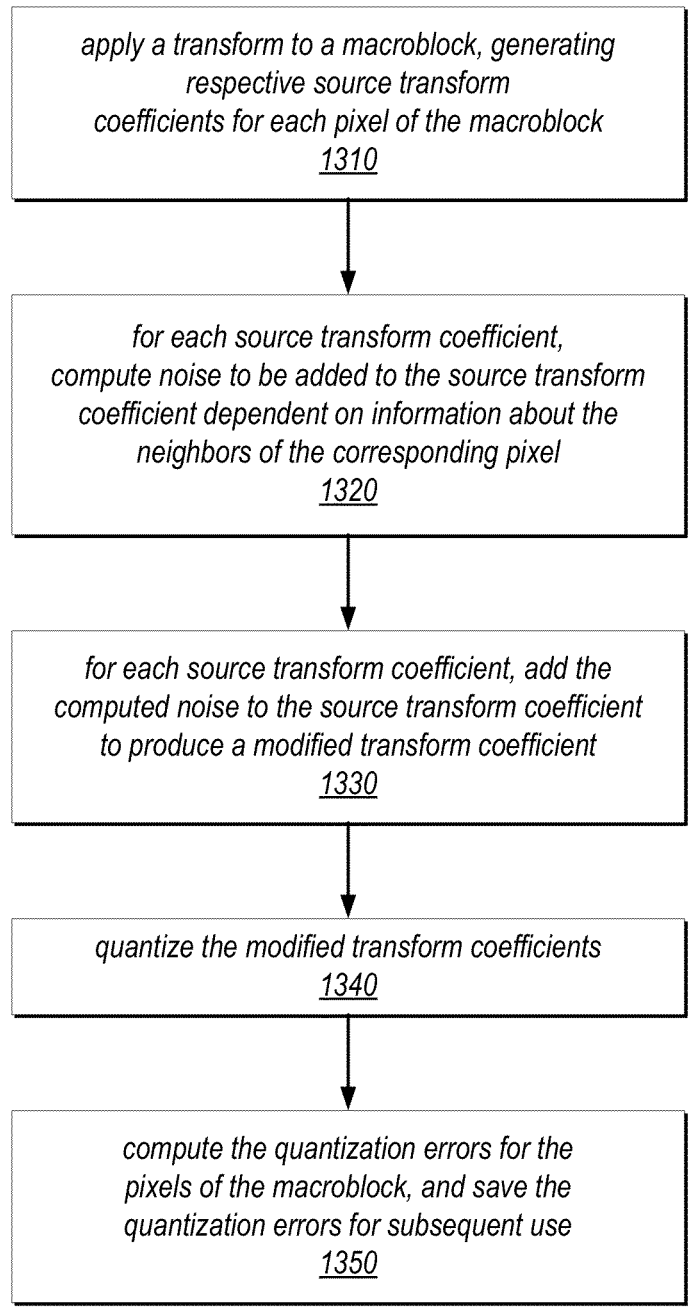
FIG. 13 is a flow diagram illustrating a portion of a method for performing video encoding, according to at least some embodiments.

One embodiment of such a method for performing video encoding is illustrated by the flow diagram in FIG. 13. As illustrated at 1310, in this example, the method may include applying a transform to a macroblock, generating respective source transform coefficients for each pixel of the macroblock. For example, in some embodiments, the outputs of the transform may be (or may include) a DC transform coefficient for each pixel of the macroblock. As illustrated in this example, the method may include computing, for each source transform coefficient, an amount of noise to be added to the source transform coefficient dependent on information about the neighbors of the corresponding pixel (as in 1320). In other words, the method may include applying a neighbor-data-based dithering operation to each of the source transform coefficients.

As illustrated in FIG. 13, the method may include, for each source transform coefficient, adding the computed noise to the source transform coefficient to produce a modified transform coefficient, as in 1330. The method may also include quantizing the modified transform coefficients, as in 1340. As illustrated in this example, the method may include computing the quantization errors for the pixels of the macroblock, and saving the quantization errors for subsequent use, as in 1350. For example, in some embodiments, the quantization errors for the pixels of the macroblock may be saved in a data structure corresponding to the macroblock.

In some embodiments, the neighbor-data-based dithering operation applied to each of the source transform coefficients may use information about surrounding neighbors to generate the noise that is to be added to the source transform coefficient. In some embodiments, this noise may represent a linear combination of the quantization noise that resulted from the quantization operations previously performed for the neighbors. In some embodiments, the coefficients that are used to weight the neighboring noise (i.e., the weighting coefficients) may be chosen such that they shape the resulting noise so that it is not visible (e.g., so that quantization does not produce visible artifacts). For example, in some embodiments, the coefficients may be chosen in such that they implement a low-pass filter, and if this noise is subtracted out, the resulting operation is a high-pass filter, effectively pushing the quantization noise out into the higher frequencies (where it is less detectable to the human eye than low-frequency noise).

This approach to noise weighting may also be thought of as an approach that includes predicting the quantization noise that will result from the quantization of the current coefficient and modifying the quantization process in response to the prediction to improve the result. For example, the neighbor-data-based dithering operation applied to each of the source transform coefficients may, in some embodiments, consider the corresponding DC transform coefficients in the neighbors (e.g., the top, top-right, top-left, and left neighbors) as a predicator for the DC coefficient for the current pixel. In other embodiments, the neighbor-data-based dithering operation may consider DC transform coefficients that are available from more, fewer, or different neighbors.

In one example, the dithering component may implement an operation to compute such a predictor as the sum of the products of the source coefficients for each of the neighbors and a corresponding weighting coefficient. In this example, the result of the dithering operation (e.g., the difference between the source transform coefficient for the current pixel and this predictor value) may be quantized rather than the source transform coefficient. In another example, the dithering component may implement an operation to compute the noise to be added to the source transform coefficient as the sum of the products of the quantization errors for each of the neighbors and a corresponding weighting coefficient. In this example, the noise added to the source transform coefficient represents a linear combination of the quantization errors of its neighbors.

Note that while in several examples described herein the neighbors for which information is considered in a neighbor-data-based dithering operation include the top, top-right, top-left, and left neighbors, in other embodiments, different types and/or amounts of neighbor information may be used by a neighbor-data-based dithering operation. For example, in some of the embodiments described herein, the methods used for block processing (e.g., processing in knight's order, compliance to the H.264 specification, etc.) may affect the amount of neighbor information that is available for use in a neighbor-data-based dithering operation. In some embodiments, in addition to the neighbor information needed to perform other processing steps in the processing pipeline, the video encoders described herein may save additional neighbor information to support a neighbor-data-based dithering operation (e.g., more information for each neighbor and/or information for additional neighbors).

In some embodiments, the algorithm for quantization may be described as follows:
1. Apply a neighbor-data-based dithering operation to each source transform coefficient (e.g., each chroma DC transform coefficient) prior to quantization, as follows:

$$\tilde{X} = X + h_0 e_1 + h_2 e_2 + h_3 e_3$$

2. Define the quantization error E as E=X−Q[X], where X is equal to the value of the source transform coefficient and Q[X] the quantized value of the modified transform coefficient.
3. Save the quantization error computed for each source DC transform coefficient in a macroblock for subsequent use as neighbor information.

In this example, the values $h_i$ represent programmable weighting coefficients that are applied to specific ones of the neighbor pixels, and the values $e_i$ represent the neighboring quantization errors that were stored in step 3 when each of the neighbor pixels was processed. Note that because the values $h_i$ programmable, they may vary on a per-macroblock basis, in some embodiments.

Figure 14:
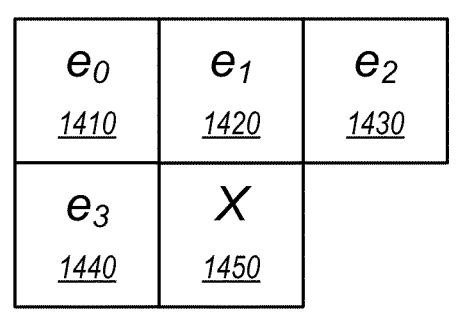

One example of the use of neighboring quantization errors in a dithering operation such as that described above is illustrated by the block diagram in FIG. 14, according to some embodiments. In this example, the quantization errors for the neighbors of a current pixel in position 1450 are illustrated at 1410 (the quantization error $e_0$ for the top-left neighbor), 1420 (the quantization error $e_i$ for the top neighbor), 1430 (the quantization error $e_2$ for the top-right neighbor), and 1440 (the quantization error $e_2$ for the left neighbor). As described herein, in some embodiments, each of these quantization errors may be multiplied by a respective weighting coefficient, and the resulting products may be added to the DC transform coefficient for the current pixel, X, to generate a modified coefficient, $\hat{X}$.

Note that in some embodiments, the weighting coefficients by which the quantization errors of the neighbors are multiplied may be programmed (or otherwise configured) such that they represent a low-pass filter. In such embodiments, the quantization noise may be pushed out into the high frequencies. For example, one representative set of such weighting coefficients may include the following coefficient values:

$$h_1 = \frac{3}{8}, h_2 = \frac{3}{8}, h_2 = \frac{1}{8}, h_0 = \frac{1}{8}.$$

As previously noted, applying a neighbor-data-based dithering operation to the quantization process for the luma or chroma coefficients may serve to reduce color banding artifacts. In some embodiments, the neighbor-data-based dithering operation and quantization process described above may also serve to reduce blocking artifacts.

Figure 15:
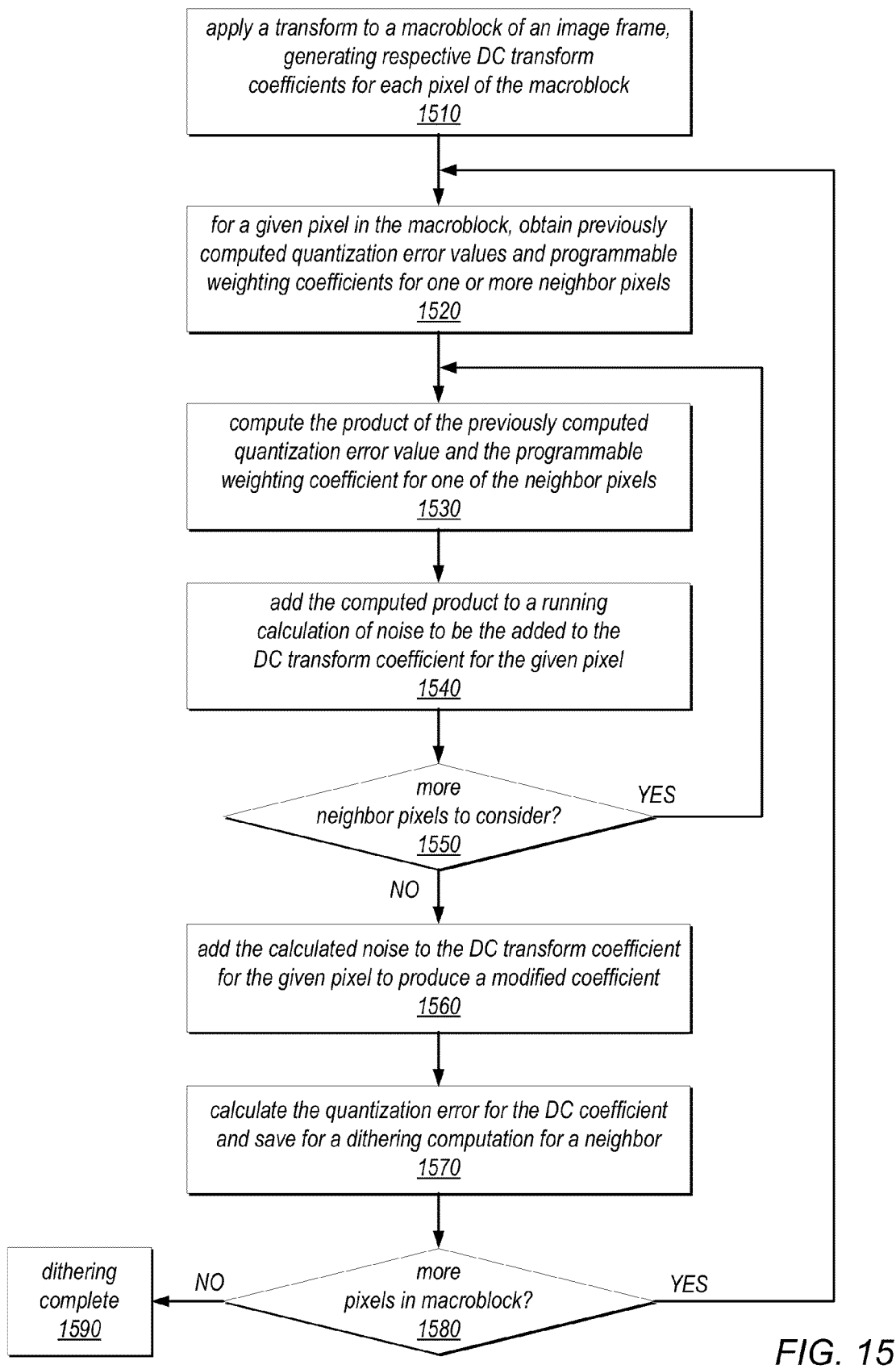
FIG. 15 is a flow diagram illustrating a method for performing a weighted dithering operation on DC transform coefficients, according to at least some embodiments.

One embodiment of a method for performing a neighbor-data-based weighted dithering operation on DC transform coefficients is illustrated by the flow diagram in FIG. 15. As illustrated at 1510, in this example, the method may include applying a transform to a macroblock of an image frame, generating respective DC transform coefficients for each pixel of the macroblock. The method may include, for a given pixel in the macroblock, obtaining previously computed quantization error values and programmable weighting coefficients for one or more neighbor pixels of the given pixel (i.e., the pixel currently being processed), as in 1520. As illustrated in this example, the method may include computing the product of the previously computed quantization error value and the programmable weighting coefficient for one of the neighbor pixels, as in 1530, and adding the computed product to a running calculation of noise to be the added to the DC transform coefficient for the given pixel, as in 1540.

If there are more neighbor pixels to consider (e.g., if the dithering operation is dependent on the quantization errors of additional neighbor pixels), the operations illustrated at 1530 and 1540 may be repeated for each of the additional pixels. This is illustrated in FIG. 15 by the feedback from the positive exit of 1550 to 1530. In other words, the method may include computing the noise to be added to the given pixel by multiplying the respective quantization errors for each of the applicable neighbor pixels by a respective weighting coefficient and accumulating the resulting products. If there are no more neighbor pixels to consider, or once data from all appropriate neighbor pixels has been considered (shown as the negative exit from 1550), the method may include adding the calculated noise to the DC transform coefficient for the given pixel to produce a modified coefficient, as in 1560. As described herein, the method may also include calculating the quantization error for the DC coefficient and saving the quantization error for use in a subsequent dithering computation for a neighbor pixel of the given pixel, as in 1570.

As illustrated in this example, if there are more pixels in the macroblock, the operations illustrated at 1520 to 1570 may be repeated for each additional pixel in the macroblock. This is illustrated in FIG. 15 as the feedback from the positive exit of 1580 to 1520. If not, or once all of the pixels in the macroblock have been processed (shown as the negative exit from 1580), the weighted dithering operation may be complete, as in 1590.

Figure 16:
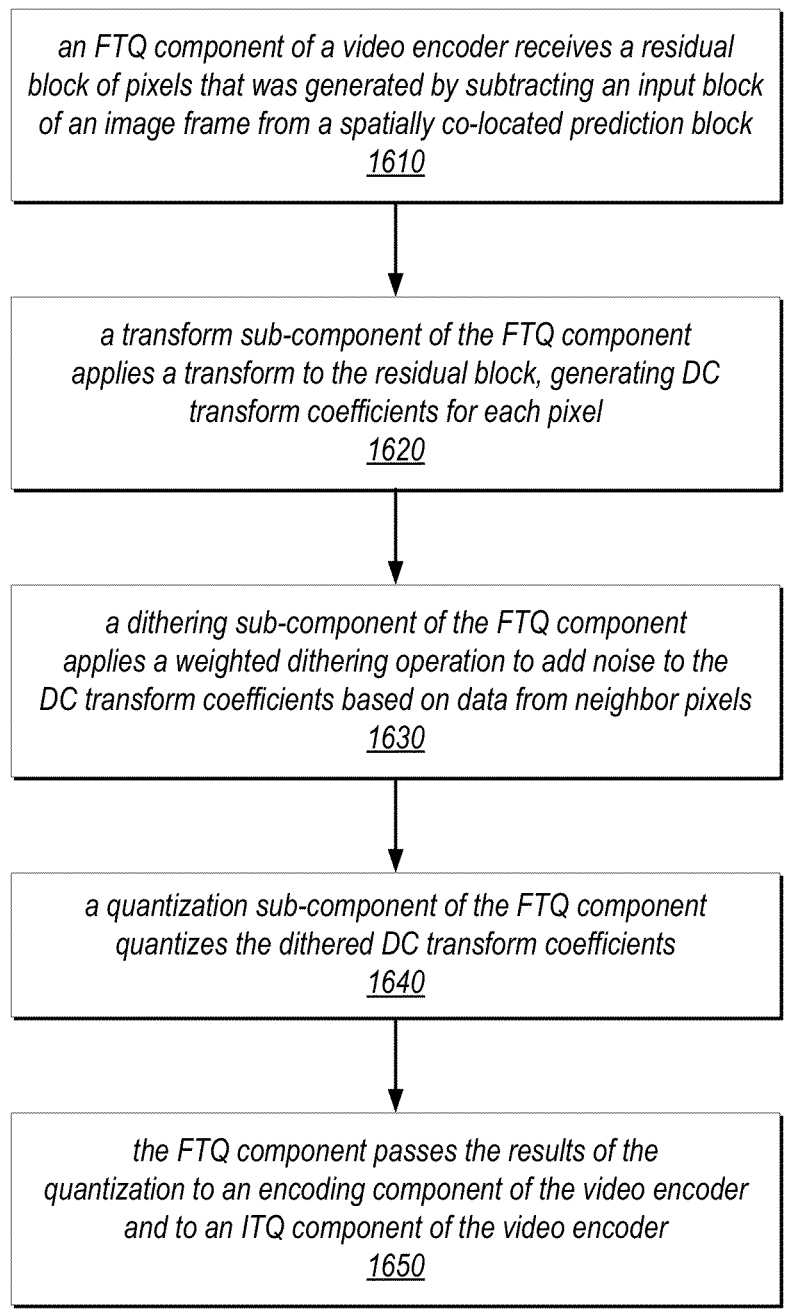
FIG. 16 is a flow diagram illustrating a method for performing forward transform and quantization operations, according to at least some embodiments.

As described above, in some embodiments, the neighbor-data-based dithering operations described herein may be implemented by an FTQ component of a video encoder, such as FTQ 1140 illustrated in FIG. 11 and/or FTQ 1250 illustrated in FIG. 12. One embodiment of a method for performing forward transform and quantization operations in a video encoder is illustrated by the flow diagram in FIG. 16. As illustrated at 1610, in this example, the method may include an FTQ component of a video encoder receiving a residual block of pixels that was generated by subtracting an input block of an image frame from a spatially co-located prediction block. The method may include a transform sub-component of the FTQ component applying a transform to the residual block, generating DC transform coefficients for each pixel, as in 1620. As illustrated in FIG. 16, the method may also include a dithering sub-component of the FTQ component applying a weighted dithering operation to add noise to the DC transform coefficients based on data from neighbor pixels, as in 1630. For example, the dithering sub-component of the FTQ component may compute an amount of noise to add to each DC transform coefficient based on previously computed quantization errors for neighboring pixels and/or on weighting transform coefficients that are selected (e.g., programmed or otherwise configured) in such a way as to apply a particular filtering operation to the DC transform coefficients.

As illustrated in this example, the method may include a quantization sub-component of the FTQ component quantizing the dithered DC transform coefficients, as in 1640. The method may also include the FTQ component passing the results of the quantization to an encoding component of the video encoder and to an ITQ component of the video encoder, as in 1650. In some embodiments, the operations illustrated in FIG. 16 may be repeated for each macroblock of each image frame of a digital video input stream, although for simplicity, this is not shown in FIG. 16. Note that, in various embodiments, the operations illustrated in FIG. 16 may be applied to the chroma components of image macroblocks and/or to luma components of image macroblocks.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. Referring again to FIG. 10, for the top row of a next quadrow, macroblock input 1002 may then read this neighbor data from the memory at quadrow boundaries and pass the neighbor data to at least one downstream stage of the pipeline.

Transcoder

In at least some embodiments, a transcoding operation may be performed by a transcoder 1050. The transcoder may be implemented as a functional component of the pipeline or as a functional component that is external to the pipeline. In at least some embodiments, the transcoder 1050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 1050 handles stitching the start and end of each row to generate a continuous stream at macroblock row boundaries. In at least some embodiments, the pipeline may embed metadata in the CAVLC output stream to facilitate stitching of the rows by the transcoder 1050.

Example Video Encoder Apparatus

FIG. 17 is a block diagram of an example video encoder apparatus 1700, according to at least some embodiments. The video encoder apparatus 1700 may, for example, be implemented as an integrated circuit (IC) or as a subsystem on an IC such as a system-on-a-chip (SOC). In at least some embodiments, the video encoder apparatus 1700 may include a pipeline 1740 component, a processor 1710 component (e.g., a low-power multicore processor), a memory management unit (MMU) 1720, DMA 1730, and an interconnect 1750 such as a bus subsystem or fabric that interconnects the functional components of the apparatus. The processor 1710 component of the video encoder apparatus 1700 may, for example, perform frame-level control of the pipeline 1740 such as rate control—perform pipeline 1740 configuration including configuration of individual pipeline units within the pipeline 1740, and interface with application software via a driver, for example for video encoder 1700 configuration. The MMU 1720 may serve as an interface to external memory, for example for streaming video input and/or output. Pipeline 1740 component may access memory through MMU 1720 via DMA 1730. In some embodiments, the video encoder apparatus 1700 may include other functional components or units not shown in FIG. 17, or fewer functional components than those shown in FIG. 17. An example block processing method that may be implemented by pipeline 1740 component is shown in FIG. 10. An example a system-on-a-chip (SOC) that may include at least one video encoder apparatus 1700 is illustrated in FIG. 18.

Example System on a Chip (SOC)

Turning now to FIG. 18, a block diagram of one embodiment of a system-on-a-chip (SOC) 1800 that may include at least one instance of a video encoder apparatus including a block processing pipeline that may implement one or more of the block processing methods and apparatus as illustrated in FIGS. 3 through 17. SOC 1800 is shown coupled to a memory 1850. As implied by the name, the components of the SOC 1800 may be integrated onto a single semiconductor substrate as an integrated circuit "chip." In some embodiments, the components may be implemented on two or more discrete chips in a system. However, the SOC 1800 will be used as an example herein. In the illustrated embodiment, the components of the SOC 1800 include a central processing unit (CPU) complex 1820, on-chip peripheral components 1840A-1840B (more briefly, "peripherals"), a memory controller (MC) 1830, a video encoder 1700 (which may itself be considered a peripheral component), and a communication fabric 1810. The components 1820, 1830, 1840A-1840B, and 1700 may all be coupled to the communication fabric 1810. The memory controller 1830 may be coupled to the memory 1850 during use, and the peripheral 1840B may be coupled to an external interface 1860 during use. In the illustrated embodiment, the CPU complex 1820 includes one or more processors (P) 1824 and a level two (L2) cache 1822. In some embodiments, the CPU complex may be configured to cache neighbor data, which may include source transform coefficients (e.g., DC transform coefficients), modified transform coefficients, previously computed quantization errors, and/or weighting coefficient values for one or more neighbor pixels, among other information used in the video encoding operations described herein.

The peripherals 1840A-1840B may be any set of additional hardware functionality included in the SOC 1800. For example, the peripherals 1840A-1840B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 1860 external to the SOC 1800 (e.g. the peripheral 1840B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 18, SOC 1800 may include at least one instance of a video encoder 1700 component, for example a video encoder 1700 as illustrated in FIG. 17 that includes a block processing pipeline 1740 component that implements a block processing method 1000 as illustrated in FIG. 10. Video encoder 1700 may be an H.264 video encoder apparatus that may be configured to convert input video frames from an input format into H.264/Advanced Video Coding (AVC) format as described in the H.264/AVC standard. The block processing pipeline 1740 may implement one or more of the block processing methods and apparatus as described herein in relation to FIGS. 3 through 16.

The CPU complex 1820 may include one or more CPU processors 1824 that serve as the CPU of the SOC 1800. The CPU of the system includes the processor(s) that execute the main control software of the system, such as an operating system. Generally, software executed by the CPU during use may control the other components of the system to realize the desired functionality of the system. The processors 1824 may also execute other software, such as application programs. The application programs may provide user functionality, and may rely on the operating system for lower level device control. Accordingly, the processors 1824 may also be referred to as application processors. The CPU complex 1820 may further include other hardware such as the L2 cache 1822 and/or and interface to the other components of the system (e.g. an interface to the communication fabric 1810). Generally, a processor may include any circuitry and/or microcode configured to execute instructions defined in an instruction set architecture implemented by the processor. The instructions and data operated on by the processors in response to executing the instructions may generally be stored in the memory 1850, although certain instructions may be defined for direct processor access to peripherals as well. In some embodiments, the data stored in memory 1850 may include weighting coefficient values to be applied for one or more neighbor pixels in a neighbor-data-based dithering operation. Processors may encompass processor cores implemented on an integrated circuit with other components as a system on a chip (SOC 1800) or other levels of integration. Processors may further encompass discrete microprocessors, processor cores and/or microprocessors integrated into multichip module implementations, processors implemented as multiple integrated circuits, etc.

The memory controller 1830 may generally include the circuitry for receiving memory operations from the other components of the SOC 1800 and for accessing the memory 1850 to complete the memory operations. The memory controller 1830 may be configured to access any type of memory 1850. For example, the memory 1850 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1830 may include queues for memory operations, for ordering (and potentially reordering) the operations and presenting the operations to the memory 1850. The memory controller 1830 may further include data buffers to store write data awaiting write to memory and read data awaiting return to the source of the memory operation. In some embodiments, the memory controller 1830 may include a memory cache to store recently accessed memory data. In SOC implementations, for example, the memory cache may reduce power consumption in the SOC by avoiding reaccess of data from the memory 1850 if it is expected to be accessed again soon. In some cases, the memory cache may also be referred to as a system cache, as opposed to private caches such as the L2 cache 1822 or caches in the processors 1824, which serve only certain components. Additionally, in some embodiments, a system cache need not be located within the memory controller 1830.

In an embodiment, the memory 1850 may be packaged with the SOC 1800 in a chip-on-chip or package-on-package configuration. A multichip module configuration of the SOC 1800 and the memory 1850 may be used as well. Such configurations may be relatively more secure (in terms of data observability) than transmissions to other components in the system (e.g. to the end points 16A-16B). Accordingly, protected data may reside in the memory 1850 unencrypted, whereas the protected data may be encrypted for exchange between the SOC 1800 and external endpoints.

The communication fabric 1810 may be any communication interconnect and protocol for communicating among the components of the SOC 1800. The communication fabric 1810 may be bus-based, including shared bus configurations, cross bar configurations, and hierarchical buses with bridges. The communication fabric 1810 may also be packet-based, and may be hierarchical with bridges, cross bar, point-to-point, or other interconnects.

It is noted that the number of components of the SOC 1800 (and the number of subcomponents for those shown in FIG. 18, such as within the CPU complex 1820) may vary from embodiment to embodiment. There may be more or fewer of each component/subcomponent than the number shown in FIG. 18.

Example System

Figure 19:
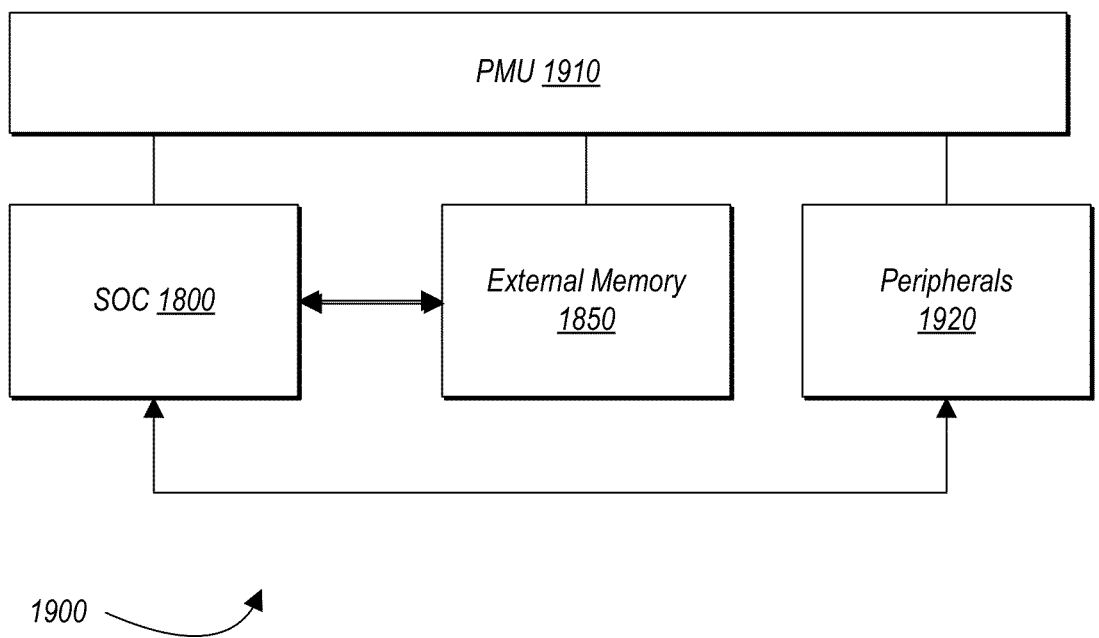
FIG. 19 is a block diagram illustrating one embodiment of a system that includes at least one instance of an SOC.

FIG. 19 a block diagram of one embodiment of a system 1900. In the illustrated embodiment, the system 1900 includes at least one instance of the SOC 1800 coupled to one or more external peripherals 1920 and the external memory 1850. A power management unit (PMU) 1910 is provided which supplies the supply voltages to the SOC 1800 as well as one or more supply voltages to the memory 1850 and/or the peripherals 1920. In some embodiments, more than one instance of the SOC 1800 may be included (and more than one memory 1850 may be included as well).

The peripherals 1920 may include any desired circuitry, depending on the type of system 1900. For example, in one embodiment, the system 1900 may be a mobile device (e.g. personal digital assistant (PDA), smart phone, etc.) and the peripherals 1920 may include devices for various types of wireless communication, such as wifi, Bluetooth, cellular, global positioning system, etc. The peripherals 1920 may also include additional storage, including RAM storage, solid state storage, or disk storage. The peripherals 1920 may include user interface devices such as a display screen, including touch display screens or multitouch display screens, keyboard or other input devices, microphones, speakers, etc. In other embodiments, the system 1900 may be any type of computing system (e.g. desktop personal computer, laptop, workstation, net top etc.).

The external memory 1850 may include any type of memory. For example, the external memory 1850 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 1850 may include one or more memory modules to which the memory devices are mounted, such as single inline memory modules (SIMMs), dual inline memory modules (DIMMs), etc. Alternatively, the external memory 1850 may include one or more memory devices that are mounted on the SOC 1800 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline configured to process blocks of pixels from a video frame;
wherein one or more components of the block processing pipeline are collectively configured to:
receive a representation of a block of pixels comprising a respective source transform coefficient for each pixel of the block of pixels;
add noise to each of the source transform coefficients to produce modified transform coefficients; and
quantize the modified transform coefficients;
wherein the noise added to the source transform coefficient for each pixel is dependent on information that was previously computed for each of two or more neighboring pixels.

2. The apparatus of claim 1, wherein the noise added to the source transform coefficient for each pixel is dependent on a respective quantization error previously computed for each of the two or more neighboring pixels.

3. The apparatus of claim 2, wherein the one or more components are further configured to compute the noise to be added to each of the source transform coefficients, and wherein to compute the noise, the one or more components are configured to multiply each of the respective quantization errors by a respective weighting coefficient and to accumulate the resulting products.

4. The apparatus of claim 3, wherein values of the respective weighting coefficients are selected such that the addition of the computed noise to each of the source transform coefficients implements a low-pass filter operation.

5. The apparatus of claim 1, wherein the noise added to the source transform coefficient for each pixel is dependent on a respective weighting coefficient for each of the two or more neighboring pixels.

6. The apparatus of claim 5, wherein the respective weighting coefficient for each of the two or more neighboring pixels is configurable.

7. The apparatus of claim 5, wherein the respective weighting coefficients for at least two of the two or more neighboring pixels have different values.

8. The apparatus of claim 1, wherein the two or more neighboring pixels comprise two or more of: a top neighbor pixel, a top-right neighbor pixel, a top-left neighbor pixel, or a left neighbor pixel.

9. The apparatus of claim 1, wherein each of the source transform coefficients represents a transform coefficient of a chroma component of the block of pixels, a transform coefficient of a luma component of the block of pixels, a DC transform coefficient, or a transform coefficient produced by transforming a residual block for the block of pixels.

10. The apparatus of claim 9, wherein the one or more components are further configured to compute the residual block for the block of pixels as a difference between an input representation of the block pixels and a predicted representation of the block of pixels.

11. The apparatus of claim 1, wherein the one or more components are further configured to:
compute a quantization error for each pixel of the block of pixels as a difference between the source transform coefficient for the pixel and the quantized modified transform coefficient for the pixel; and
wherein the information that was previously computed for each of the two or more neighboring pixels comprises the computed quantization errors for each of the two or more neighboring pixels.

12. A method, comprising:
receiving a representation of a block of pixels comprising a respective source transform coefficient for each pixel of the block of pixels;
computing a respective amount of noise to be added to each of the source transform coefficients dependent on information that was previously computed for each of two or more neighboring pixels;

adding the respective amount noise to each of the source transform coefficients to produce modified transform coefficients; and quantizing the modified transform coefficients.

13. The method of claim 12, wherein said computing the respective amount of noise to be added to the source transform coefficient for each pixel is dependent on a respective quantization error previously computed for each of the two or more neighboring pixels.

14. The method of claim 12, wherein said computing the respective amount of noise to be added to the source transform coefficient for each pixel is dependent on a respective weighting coefficient for each of the two or more neighboring pixels.

15. The method of claim 14, wherein the respective weighting coefficients for at least two of the two or more neighboring pixels have different values.

16. The method of claim 12, wherein each of the source transform coefficients represents a transform coefficient of a chroma component of the block of pixels, a transform coefficient of a luma component of the block of pixels, a DC transform coefficient, or a transform coefficient produced by transforming a residual block for the block of pixels.

17. A device, comprising:
a memory; and
an apparatus configured to process video frames and to store the processed video frames as frame data to the memory, the apparatus comprising a block processing pipeline that implements a plurality of stages each comprising one or more pipeline units, each pipeline unit configured to perform one or more operations on a block of pixels from a frame passing through the pipeline;
wherein one or more of the pipeline units in the block processing pipeline are collectively configured to:
receive a representation of a block of pixels comprising a respective source transform coefficient for each pixel of the block of pixels;
add noise to each of the source transform coefficients to produce modified transform coefficients; and
quantize the modified transform coefficients;
wherein the noise added to the source transform coefficient for each pixel is dependent on a modified transform coefficient or a quantization error that was previously computed for each of two or more neighboring pixels.

18. The device of claim 17, wherein the one or more pipeline units are further configured to compute the noise to be added to each of the source transform coefficients, and wherein to compute the noise, the one or more pipeline units are configured to multiply the quantization error for each of the two or more neighboring pixels by a respective weighting coefficient and to accumulate the resulting products.

19. The device of claim 18,
wherein the respective weighting coefficient for each of the two or more neighboring pixels is configurable; and
wherein the respective weighting coefficients for at least two of the two or more neighboring pixels have different values.

20. The device of claim 18,
wherein values of the respective weighting coefficients for each of the two or more neighboring pixels are selected such that the addition of the computed noise to each of the source transform coefficients implements a low-pass filter operation.

* * * * *